United States Patent
Guest et al.

(10) Patent No.: US 10,492,566 B2
(45) Date of Patent: Dec. 3, 2019

(54) ARTICLE OF FOOTWEAR WITH TUBULAR STRUCTURES

(71) Applicant: NIKE, Inc., Beaverton, OR (US)

(72) Inventors: Stefan E. Guest, Portland, OR (US); Matthew J. Holmes, Portland, OR (US); Yoav Sterman, Portland, OR (US)

(73) Assignee: NIKE, Inc., Beaverton, OR (US)

(*) Notice: Subject to any disclaimer, the term of this patent is extended or adjusted under 35 U.S.C. 154(b) by 162 days.

(21) Appl. No.: 15/370,976

(22) Filed: Dec. 6, 2016

(65) Prior Publication Data

US 2017/0156445 A1 Jun. 8, 2017

Related U.S. Application Data

(60) Provisional application No. 62/263,891, filed on Dec. 7, 2015, provisional application No. 62/263,916, filed (Continued)

(51) Int. Cl.
*A63B 23/02* (2006.01)
*A43B 23/24* (2006.01)
(Continued)

(52) U.S. Cl.
CPC .............. *A43C 1/06* (2013.01); *A43B 3/26* (2013.01); *A43B 13/181* (2013.01); *A43B 13/22* (2013.01); *A43B 23/00* (2013.01); *A43B 23/02* (2013.01); *A43B 23/0245* (2013.01); *A43B 23/042* (2013.01); *A43B 23/24* (2013.01); *A43C 1/00* (2013.01); *A43C 1/04* (2013.01); *A43C 7/00* (2013.01); *A43C 11/16* (2013.01); *B29C 64/00* (2017.08); *B29C 64/106* (2017.08); *B29C 64/112* (2017.08); *B29C 64/30* (2017.08); *B29D 35/12* (2013.01); *B33Y 10/00* (2014.12); *B33Y 80/00* (2014.12); *A43D 2200/60* (2013.01); (Continued)

(58) Field of Classification Search
CPC ......... A43B 3/26; A43B 13/22; A43B 13/181; A43C 1/00; A43C 1/04
USPC ............................................................ 36/97
See application file for complete search history.

(56) References Cited

U.S. PATENT DOCUMENTS 5,291,671 A * 3/1994 Caberlotto ............... A43B 5/00
                                                                36/114
5,371,957 A * 12/1994 Gaudio ................... A43B 11/00
                                                                 36/45

(Continued)

FOREIGN PATENT DOCUMENTS

GB         2449722         12/2008
WO     WO 2013/113339       8/2013

OTHER PUBLICATIONS

International Search Report and Written Opinion, dated Apr. 18, 2017, for corresponding International Patent Application No. PCT/US2016/065184, 16 pages.

*Primary Examiner* — Anne M Kozak
(74) *Attorney, Agent, or Firm* — Klarquist Sparkman, LLP

(57) ABSTRACT

An article of footwear has a tubular structure that may conform to various anatomical features of a foot. The tubular structure has a tunnel, and a tensile strand runs through the tunnel. Applying tension along the tensile strand may cause the tubular structure to conform more closely to one or more anatomical features. The geometry, or path, of the tubular structure on the article may be customized.

10 Claims, 18 Drawing Sheets

Related U.S. Application Data on Dec. 7, 2015, provisional application No. 62/263,923, filed on Dec. 7, 2015, provisional application No. 62/263,898, filed on Dec. 7, 2015, provisional application No. 62/263,834, filed on Dec. 7, 2015.

(51) Int. Cl.

| | | |
|---|---|---|
| *A43C 1/04* | (2006.01) | |
| *A43C 7/00* | (2006.01) | |
| *A43C 11/16* | (2006.01) | |
| *A43B 23/04* | (2006.01) | |
| *B29K 101/12* | (2006.01) | |
| *B29L 31/50* | (2006.01) | |
| *A43B 3/26* | (2006.01) | |
| *A43B 13/18* | (2006.01) | |
| *A43B 13/22* | (2006.01) | |
| *A43C 1/06* | (2006.01) | |
| *B33Y 10/00* | (2015.01) | |
| *B33Y 80/00* | (2015.01) | |
| *B29D 35/12* | (2010.01) | |
| *A43B 23/00* | (2006.01) | |
| *A43C 1/00* | (2006.01) | |
| *B29C 64/00* | (2017.01) | |
| *B29C 64/106* | (2017.01) | |
| *B29C 64/112* | (2017.01) | |
| *B29C 64/30* | (2017.01) | |
| *A43B 23/02* | (2006.01) | |
| *A43C 5/00* | (2006.01) | |
| *A43D 1/02* | (2006.01) | |
| *B29L 31/00* | (2006.01) | |

(52) U.S. Cl.
CPC .. *B29K 2101/12* (2013.01); *B29K 2995/0082* (2013.01); *B29L 2031/505* (2013.01); *B29L 2031/727* (2013.01)

(56) References Cited

U.S. PATENT DOCUMENTS

| | | | | |
|---|---|---|---|---|
| 5,755,044 A | * | 5/1998 | Veylupek | A43C 1/003 36/50.1 |
| 6,052,921 A | * | 4/2000 | Oreck | A43C 1/00 36/50.1 |
| 6,286,233 B1 | * | 9/2001 | Gaither | A43C 1/00 36/50.1 |
| 7,721,468 B1 | * | 5/2010 | Johnson | A43C 1/06 36/118.1 |
| 8,613,150 B2 | | 12/2013 | Wong | |
| 8,701,232 B1 | * | 4/2014 | Droege | A43B 1/04 12/142 R |
| 8,904,673 B2 | * | 12/2014 | Johnson | A43C 1/00 36/50.1 |
| 8,959,959 B1 | * | 2/2015 | Podhajny | A43B 1/04 66/177 |
| 8,973,410 B1 | * | 3/2015 | Podhajny | A43B 23/024 66/177 |
| 9,060,567 B2 | * | 6/2015 | Elder | A43B 13/127 |
| 9,192,204 B1 | * | 11/2015 | Liles | A43C 1/04 |
| 9,301,567 B2 | * | 4/2016 | Dealey | A43B 1/04 |
| 9,681,704 B2 | * | 6/2017 | Podhajny | A43B 23/0205 |
| 9,775,406 B2 | * | 10/2017 | Connell | A43B 23/0265 |
| 9,788,599 B2 | * | 10/2017 | Hesterberg | A43B 13/141 |
| 9,861,162 B2 | * | 1/2018 | Kilgore | A43B 23/227 |
| 2004/0181972 A1 | | 9/2004 | Csorba | |
| 2006/0000116 A1 | | 1/2006 | Brewer | |
| 2007/0186447 A1 | | 8/2007 | Ramos | |
| 2009/0217552 A1 | | 9/2009 | Paintin et al. | |
| 2011/0308108 A1 | | 12/2011 | Berns et al. | |
| 2013/0019500 A1 | | 1/2013 | Greene | |
| 2013/0138029 A1 | | 5/2013 | Gerber et al. | |
| 2013/0298426 A1 | | 11/2013 | Pierce et al. | |
| 2014/0020192 A1 | | 1/2014 | Jones et al. | |
| 2014/0067106 A1 | | 3/2014 | Makeig | |
| 2014/0196316 A1 | | 7/2014 | Follet | |
| 2014/0223779 A1 | | 8/2014 | Elder et al. | |
| 2014/0245638 A1 | | 9/2014 | Seamarks et al. | |
| 2015/0237962 A1 | | 8/2015 | Soderberg et al. | |

\* cited by examiner

ARTICLE OF FOOTWEAR WITH TUBULAR STRUCTURES

CROSS-REFERENCE TO RELATED APPLICATIONS

This application claims the benefit of U.S. Provisional Application No. 62/263,916, filed on Dec. 7, 2015 and entitled "Article of Footwear with Tubular Structures," U.S. Provisional Application No. 62/263,923, filed Dec. 7, 2015 and entitled "Tunnel Spring Structures," U.S. Provisional Application No. 62/263,898, filed Dec. 7, 2015 and entitled "Article of Footwear with Tubular Structures Having Tab Portions," U.S. Provisional Application No. 62/263,834, filed Dec. 7, 2015 and entitled "Three-Dimensional Printing Utilizing a Captive Element," and U.S. Provisional Application No. 62/263,891, filed Dec. 7, 2015 and entitled "Segmented Tunnels on Articles," the disclosures of which are herein incorporated by reference in their entirety.

BACKGROUND

The present embodiments relate generally to articles of footwear, and in particular to articles of footwear with uppers and sole structures.

Articles of footwear generally include two primary elements: an upper and a sole structure. The upper may be formed from a variety of materials that are stitched or adhesively bonded together to form a void within the footwear for comfortably and securely receiving a foot. The sole structure is secured to a lower portion of the upper and is generally positioned between the foot and the ground. In many articles of footwear, including athletic footwear styles, the sole structure often incorporates an insole, a midsole, and an outsole.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 11 is a side schematic view of an embodiment of an article of footwear with a tubular structure in the form of a tunnel spring structure as tension is applied along a tensile strand;

DETAILED DESCRIPTION

The embodiments include articles of footwear with tubular structures for using in applying tension through one or more regions of the article of footwear, as well as methods for printing the tubular structures onto the articles of footwear. The tubular structure may extend along an upper of the article of footwear. A tensile strand may extend through a tunnel in the tubular structure. Openings in the tubular structure may allow the tensile strand to engage with one or more secondary tensile strands, which may wrap around the tensile strand and extend away from the tubular structure to engage other structures on the upper and/or a sole structure of the article of footwear. As tension is applied along the tensile strand in the tubular structure, the tension may be transferred to the secondary tensile strands, or vice versa.

In some embodiments, secondary tensile strands (which do not extend through the tunnel of the tubular structure) may extend between two different sections of the tubular structure.

In some embodiments, the path of the tubular structure may be customized according to custom foot information about a wearer's foot. The customized path may be designed to avoid bony structures and/or provide additional support to other anatomical features (e.g., the arch). The customized path for the tubular structure could be automatically designed or manually configured through, for example, a graphical interface (e.g., a GUI).

Other systems, methods, features, and advantages of the embodiments will be, or will become, apparent to one of ordinary skill in the art upon examination of the following figures and detailed description. It is intended that all such additional systems, methods, features, and advantages be included within this description, be within the scope of the embodiments, and be protected by the following claims.

Certain aspects, advantages, and novel features of the embodiments of this disclosure are described herein in the context of various embodiments; however, the disclosed methods, systems, and apparatus are not limited to any specific aspect, feature, or combination thereof. For example, the structures, systems and methods disclosed in different embodiments herein can be combined with one another in various manners, and each can also be combined with the structures, systems and methods disclosed in each of the provisional applications to which this application claims priority.

Figure 1:
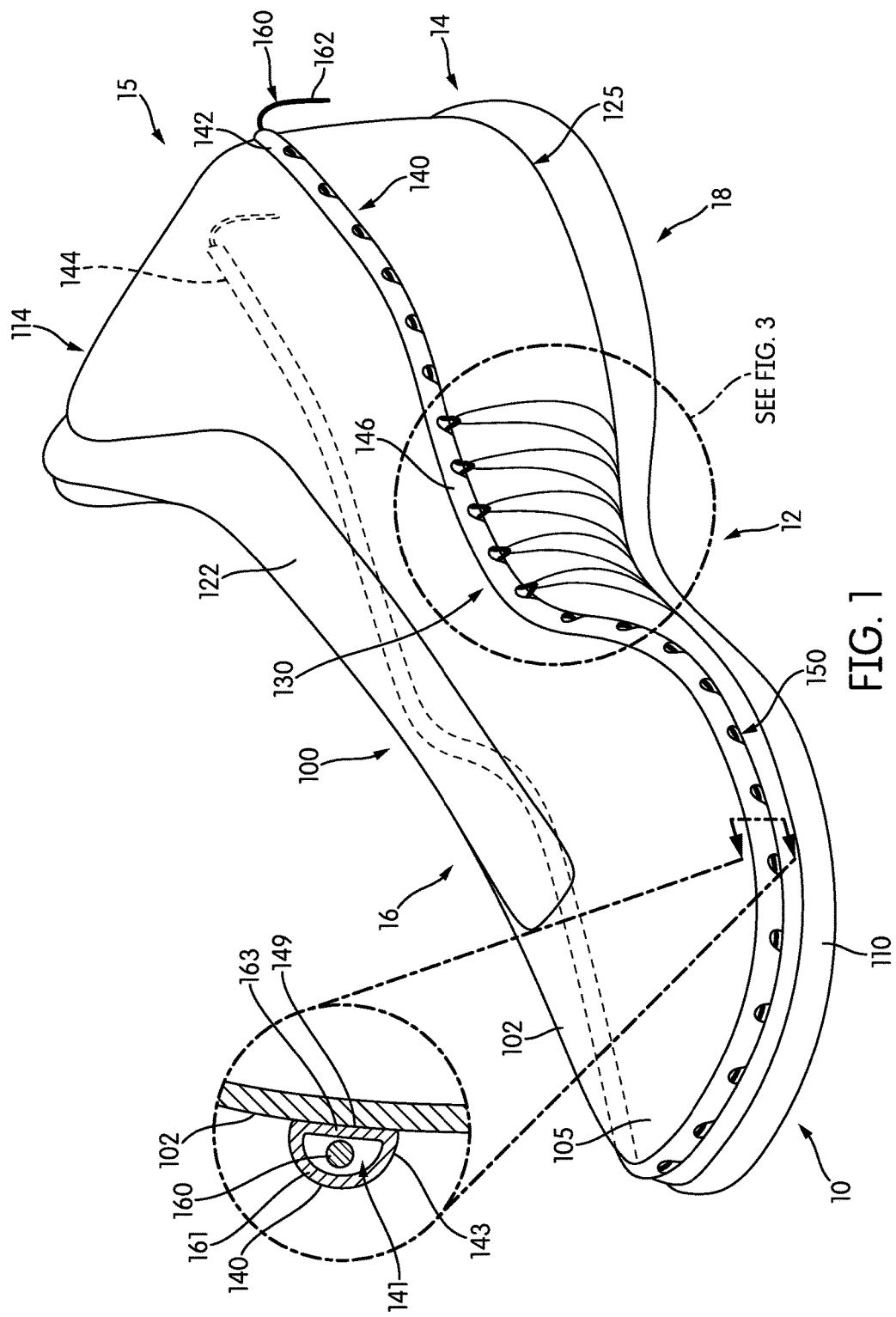
FIG. 1 is a schematic isometric view of an embodiment of an article of footwear including a tubular structure conforming to an upper of the article of footwear.

FIG. 1 is an isometric view of an embodiment of an article of footwear 100. In the exemplary embodiment, article of footwear 100 has the form of an athletic shoe. However, in other embodiments, the provisions discussed herein for article of footwear 100 could be incorporated into various other kinds of footwear including, but not limited to, basketball shoes, hiking boots, soccer shoes, football shoes, sneakers, running shoes, cross-training shoes, rugby shoes, baseball shoes as well as other kinds of shoes. Moreover, in some embodiments, the provisions discussed herein for article of footwear 100 could be incorporated into various other kinds of non-sports related footwear, including, but not limited to, slippers, sandals, high-heeled footwear, and loafers.

For purposes of clarity, the following detailed description discusses the features of article of footwear 100, also referred to simply as article 100. However, it will be understood that other embodiments may incorporate a corresponding article of footwear (e.g., a left article of footwear when article 100 is a right article of footwear) that may share some, and possibly all, of the features of article 100 described herein and shown in the figures.

The embodiments may be characterized by various directional adjectives and reference portions. These directions and reference portions may facilitate in describing the portions of an article of footwear. Moreover, these directions and reference portions may also be used in describing subcomponents of an article of footwear (e.g., directions and/or portions of a midsole structure, an outer sole structure, an upper, or any other components).

For consistency and convenience, directional adjectives are employed throughout this detailed description corresponding to the illustrated embodiments. The term "longitudinal" as used throughout this detailed description and in the claims refers to a direction extending a length of a component (e.g., an upper or sole component). A longitudinal direction may extend along a longitudinal axis, which itself extends between a forefoot portion and a heel portion of the component. Also, the term "lateral" as used throughout this detailed description and in the claims refers to a direction extending along a width of a component. A lateral direction may extend along a lateral axis, which itself extends between a medial side and a lateral side of a component. Furthermore, the term "vertical" as used throughout this detailed description and in the claims refers to a direction extending along a vertical axis, which itself is generally perpendicular to a lateral axis and a longitudinal axis. For example, in cases where an article is planted flat on a ground surface, a vertical direction may extend from the ground surface upward. Additionally, the term "inner" refers to a portion of an article disposed closer to an interior of an article, or closer to a foot when the article is worn. Likewise, the term "outer" refers to a portion of an article disposed further from the interior of the article or from the foot. Thus, for example, the inner surface of a component is disposed closer to an interior of the article than the outer surface of the component. This detailed description makes use of these directional adjectives in describing an article and various components of the article, including an upper, a midsole structure, and/or an outer sole structure.

Article 100 may be characterized by a number of different regions or portions. For example, article 100 could include a forefoot portion, a midfoot portion, a heel portion and an ankle portion. Moreover, components of article 100 could likewise comprise corresponding portions. Referring to FIG. 1, article 100 may be divided into forefoot portion 10, midfoot portion 12, and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. Article 100 may also include ankle portion 15 (which may also be referred to as a cuff portion). In addition, article 100 may include lateral side 16 and medial side 18. In particular, lateral side 16 and medial side 18 may be opposing sides of article 100. Furthermore, both lateral side 16 and medial side 18 may extend through forefoot portion 10, midfoot portion 12, heel portion 14, and ankle portion 15.

As shown in FIG. 1, article 100 may comprise upper 102 and sole structure 110. In some embodiments, sole structure 110 may be configured to provide traction for article 100. In addition to providing traction, sole structure 110 may attenuate ground reaction forces when compressed between the foot and the ground during walking, running, or other ambulatory activities. The configuration of sole structure 110 may vary significantly in different embodiments to include a variety of conventional or non-conventional structures. In some cases, the configuration of sole structure 110 can be configured according to one or more types of ground surfaces on which sole structure 110 may be used. Examples of ground surfaces include, but are not limited to, natural turf, synthetic turf, dirt, hardwood flooring, as well as other surfaces.

Sole structure 110 is secured to upper 102 and extends between the foot and the ground when article 100 is worn. In different embodiments, sole structure 110 may include different components. For example, sole structure 110 may include an outsole, a midsole, and/or an insole. In some cases, one or more of these components may be optional.

Upper 102 may include a variety of provisions for receiving and covering a foot, as well as securing article 100 to the foot. In some embodiments, upper 102 includes opening 114 that provides entry for the foot into an interior cavity of upper 102. In some embodiments, upper 102 may include tongue 122 that provides cushioning and support across the instep of the foot. Some embodiments may include fastening provisions, including, but not limited to, laces, cables, straps, buttons, zippers as well as any other provisions known in the art for fastening articles. In the embodiment shown in FIG. 1, a particular tensioning system for tensioning one or more regions of upper 102 is shown, which is described in further detail below. However, other embodiments could incorporate additional and possibly separate tensioning or fastening systems, including more traditional lacing systems that may be used to close opening 114 around a foot. Moreover, for purposes of clarity, the exemplary embodiment does not include a lace, strap, or other fastening feature that might be used to fasten opening 114. It may be appreciated however that some embodiments might incorporate a lace or other similar fastening system at the throat of article 100 and/or adjacent to opening 114.

In different embodiments, upper 102 may have a variety of different configurations. In particular, upper 102 may have any design, shape, size, and/or color. For example, in the exemplary embodiment article 100 is a basketball shoe, and, therefore, upper 102 may have a high-top configuration that is shaped to provide high support on an ankle. In other embodiments, however, upper 102 could be configured as a low-top upper for running or other activities.

Upper 102 and sole structure 110 may be attached in any manner. Embodiments can utilize any know methods for securing a sole structure to an upper, including various lasting techniques such as board-lasting, slip-lasting, combination-lasting, or strobel-lasting techniques. In FIG. 1, bite line 125 is the location along the periphery of article 100 where upper 102 meets and/or joins to sole structure 110.

Figure 2:
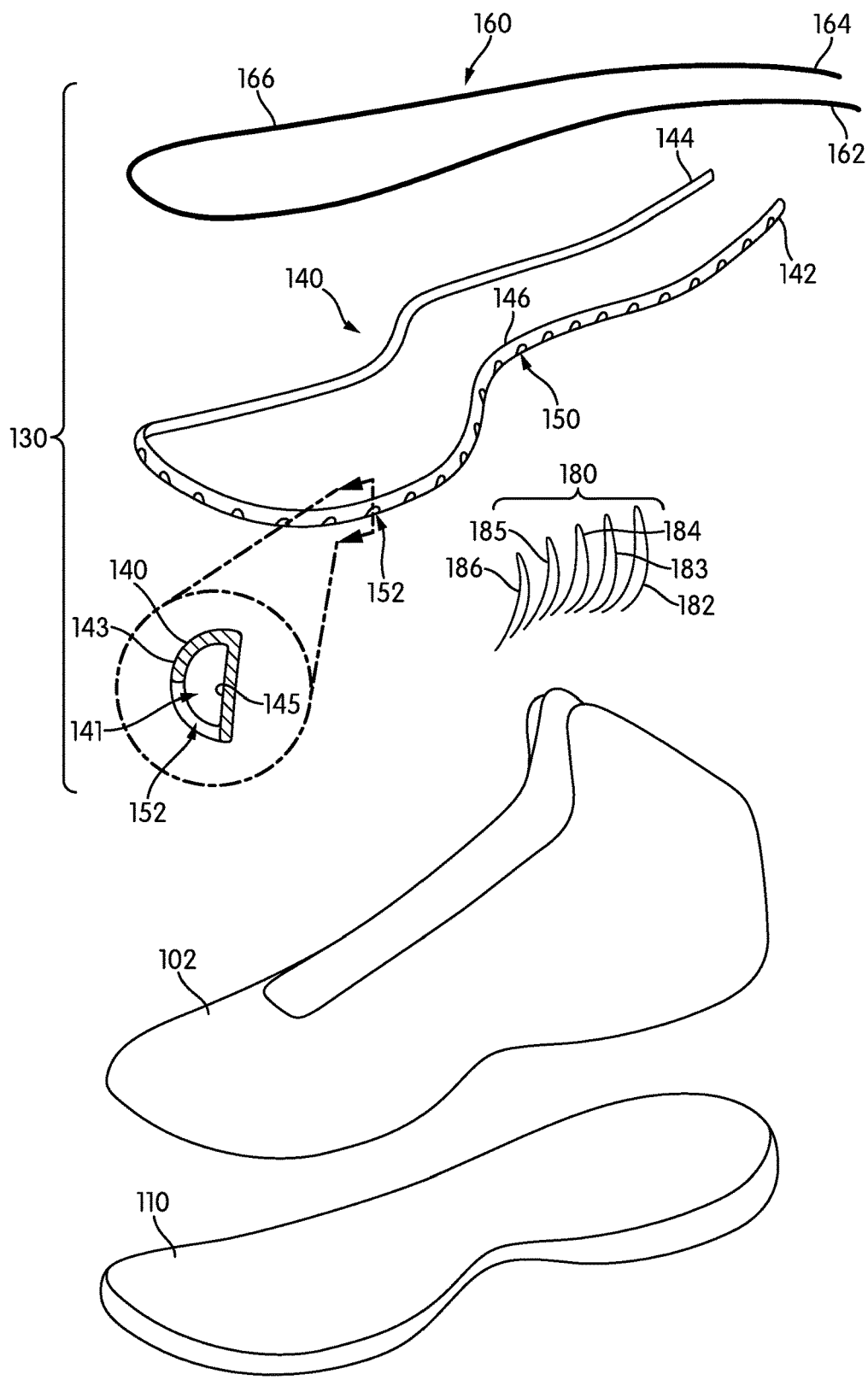
FIG. 2 is a schematic exploded isometric view of the article of footwear of FIG. 1.

FIG. 2 illustrates an exploded isometric view of an embodiment of article of footwear 100, including various components. Referring to FIGS. 1-2, article 100 may be provided with tensioning system 130. Tensioning system 130 may further include tubular structure 140, first tensile strand 160, and plurality of secondary tensile strands 180.

As used herein, the term "tubular structure" refers to any elongated structure with length greater than width and thickness (or diameter for rounded geometries), which further includes an internal tunnel or cavity through its length. In this detailed description and in the claims, the term tubular structure is not intended to be limited to structures with rounded inner and outer cross-sectional geometries. In other words, tubular structures could have outer cross-sectional geometries that are approximately rectangular or polygonal, ovoid or other geometries that need not be circular or approximately circular. In the exemplary embodiment of FIG. 1, tubular structure 140 may generally comprise an elongated structure, which further includes tunnel 141. Tubular structure 140 may further have a cross-sectional geometry that includes rounded section 161, which faces outwardly from article 100, and flattened section 163, which is generally disposed against upper 102.

Tubular structure 140 may further include first end 142, second end 144 and intermediate portion 146 that is disposed between first end 142 and second end 144. Intermediate portion 146 need not extend the full length between first end 142 and second end 144, and may generally characterize a region or segment of tubular structure 140 between first end 142 and second end 144. Tunnel 141 of tubular structure 140 may extend continuously through the entire length of tubular structure 140, from first end 142 to second end 144. Of course, it is contemplated that in other embodiments, tunnel 141 need not extend all the way to first end 142 or second end 144 of tubular structure 140.

Tubular structure 140 may be configured with one or more openings in a surface or sidewall of tubular structure 140. In FIGS. 1-2, tubular structure 140 includes plurality of openings 150. For example, as shown in FIG. 2, opening 152, which may be representative of plurality of openings 150, is disposed in outer surface 143 of tubular structure 140. Opening 152 may further extend to tunnel 141. In other words, opening 152 extends from outer surface 143 to an inner surface 145 of tubular structure 140. It will be understood that each of the remaining openings in plurality of openings 150 may likewise extend from outer surface 143 to tunnel 141. Thus, openings 150 may provide an access point for components (such as tensile strands) to enter or exit tunnel 141. Although not shown in the Figures, first end 142 and second end 144 of tubular structure 140 may likewise include openings that allow for access to tunnel 141.

The embodiment shown in FIGS. 1-2 has a common orientation for openings 150 along tubular structure 140. Specifically, each of the openings 150 is generally oriented toward bite line 125 of article 100. However, as discussed further below, other opening orientations are possible, and in some embodiments, different holes could be configured with different orientations.

In different embodiments, one or more dimensions of a tubular structure, as well as the tunnel and openings formed in the tubular structure, could vary. For example, in different embodiments, the outer diameter of a tubular structure could have any value in the range between 0.1 mm and 2 cm. Likewise, the tube thickness, characterized by the distance between the outer surface and inner surface (e.g., outer surface 143 and inner surface 145) could have any value in the range between 0.5 mm and 1.8 cm. It may be appreciated that the tunnel diameter may vary in accordance with the tube thickness (i.e., the tunnel diameter is the diameter of the tubular structure minus twice the tube thickness). Moreover, the diameter and tube thickness for a tubular structure may be selected according to various factors including desired tensile strand diameter, desired flexibility of the tubular structure, desired height of the tubular structure relative to the upper as well as possibly other factors.

Additionally, the number and arrangement of openings could vary. For example, some embodiments may include only a single opening, while others could include between two and 50 openings. Still other embodiments could include more than 50 openings. The number of openings could be selected according to the number of access points to a tunnel required, as well as the desired flexibility of a tubular structure, as additional openings may increase the flexibility of the tubular structure proximate the openings. It may also be appreciated that the openings could be disposed uniformly through the tubular structure, or in any discrete groups or patterns.

Figure 11:
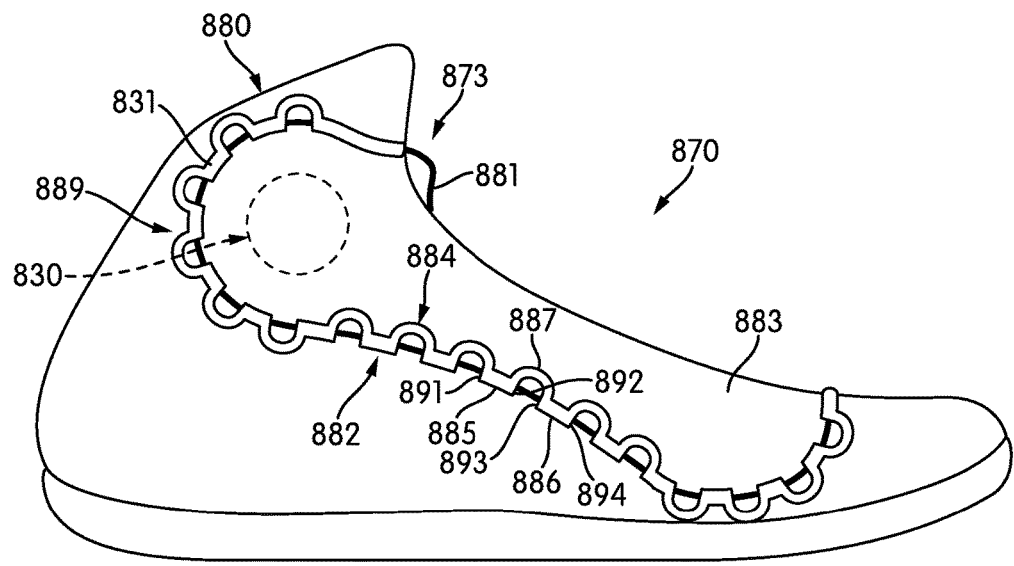
FIG. 11 is a side schematic view of an embodiment of an article of footwear with a tubular structure in the form of a tunnel spring structure.
Figure 12:
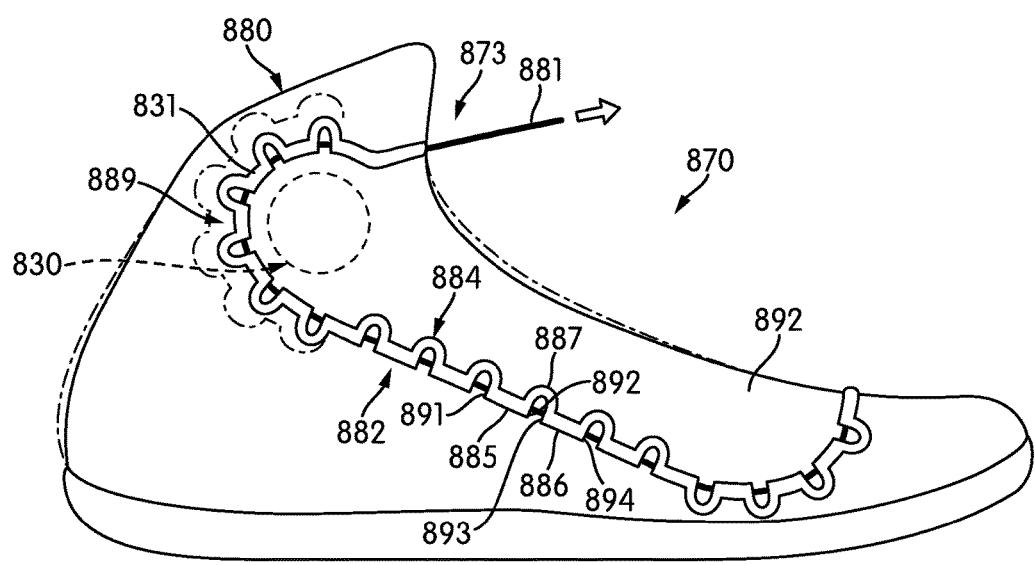

The sizes of openings could vary. For example, a circumferential dimension of an opening may characterize how much of the circumference of a tubular structure that the opening covers. Some embodiments can include openings with a circumferential dimension of only a few percent of the total circumference of the tubular structure. Still other embodiments could include openings with a circumferential dimension having a value between 20 to 80 percent of the circumference of the tubular structure. For example, in other embodiments, openings could be large enough so that only a narrow section of the tubular structure connects adjacent portions of the tubular structure at the opening. An example of a component comprised of discrete tubular structures connected by relatively narrow connecting portions is shown in FIGS. 11-12 and discussed in further detail below.

A tubular structure can be configured with various physical properties. Exemplary physical properties of the tubular structure that could be varied include rigidity, strength and flexibility or elasticity. In some embodiments, for example, a tubular structure could be configured as relatively rigid with little flexibility. In the embodiment of FIGS. 1-2, tubular structure 140 may be configured with some flexibility such that one or more portions of tubular structure 140 can undergo elastic deformation during tensioning.

Different embodiments could utilize different materials for a tubular structure. Exemplary materials may include, but are not limited to, various kinds of polymers. In embodiments where a tubular structure may be formed by a 3D printing process, the tubular structure could be made of materials including, but not limited to, thermoplastics (e.g., PLA and ABS) and thermoplastic powders, high-density polyurethane, eutectic metals, rubber, modeling clay, plasticine, RTV silicone, porcelain, metal clay, ceramic materials, plaster and photopolymers, as well as possibly other materials known for use in 3D printing. Such materials may be herein referred to as "printable materials."

Tensioning system 130 includes first tensile strand 160 and plurality of secondary tensile strands 180. As used herein, the term "tensile strand" refers to any elongated (e.g., approximately two dimensional) element capable of transferring tension across its length. Examples of various kinds of tensile strands that could be used with the embodiments include, but are not limited to, cords, laces, wires, cables, threads, ropes, filaments, yarns as well as possibly other kinds of strands. Tensile strands may be configured with different strengths as well as different degrees of stretch or elasticity.

First tensile strand 160 may comprise a cord-like element having an approximately rounded cross section. First tensile strand 160 includes first end portion 162, second end portion 164, and intermediate portion 166. Although the length of first tensile strand 160 could vary from one embodiment to another, in an exemplary embodiment, first tensile strand 160 may be longer than tubular structure 140 so that first end portion 162 and second end portion 164 extend outwardly from first end 142 and second end 144, respectively, of tubular structure 140.

In some embodiments, first tensile strand 160 may include provisions to prevent either first end portion 162 or second end portion 164 from being pulled into tunnel 141 of tubular structure 140. Such an element may be herein referred to as a "catching element," though the exemplary embodiment of FIGS. 1-2 is not depicted with any catching elements. Catching elements could include knots formed in a tensile strand or other elements that clamp or tie onto the tensile strand. A catching element may generally have a cross-sectional size and/or shape that prevents the catching element from being pulled into a tubular structure. Instead, the catching element may press against the end of the tubular structure thereby allowing the other end of the tensile strand to be pulled so as to generate tension across the tensile strand.

Figure 3:
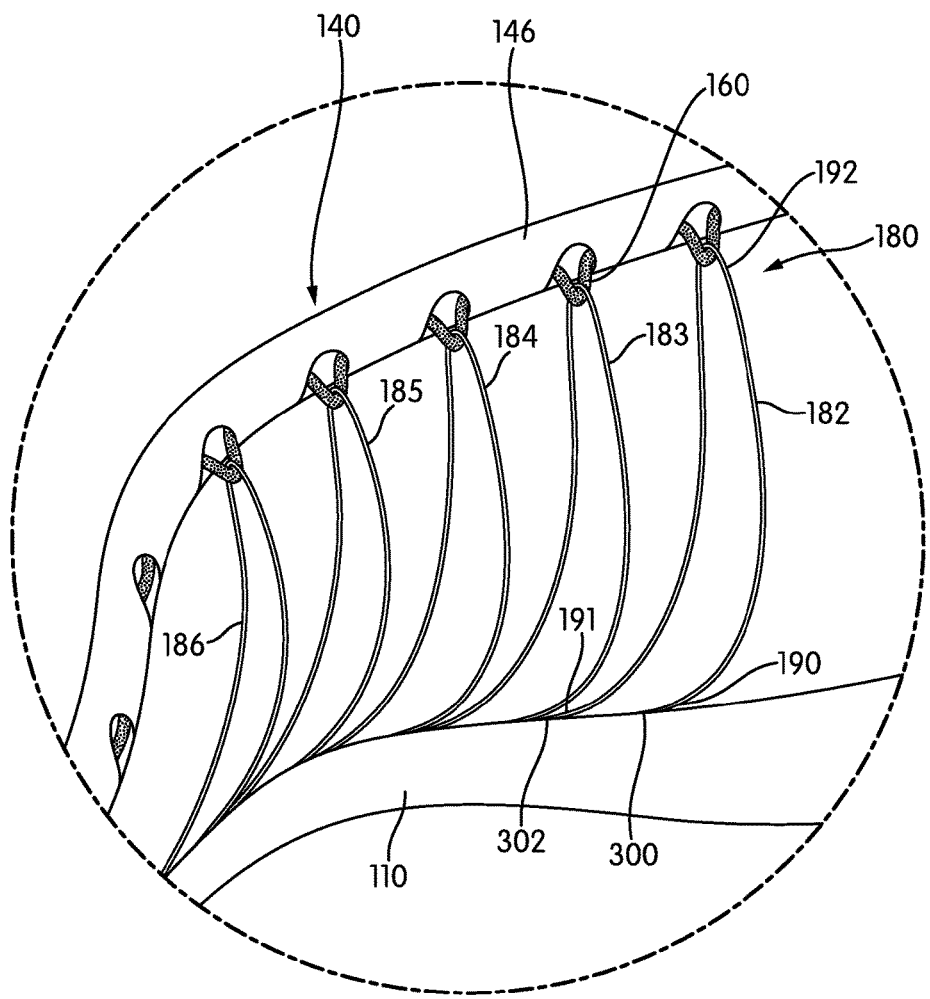
FIG. 3 is a schematic enlarged view of a portion of the article of footwear of FIG. 1.

FIG. 3 illustrates an enlarged view of a portion of article 100 including plurality of secondary tensile strands 180. Referring to FIGS. 1-3, plurality of secondary tensile strands 180 includes five secondary tensile strands (or just "tensile strands"). Specifically, as seen in FIGS. 2-3, plurality of secondary tensile strands 180 includes second tensile strands 182, third tensile strand 183, fourth tensile strand 184, fifth tensile strand 185, and sixth tensile strand 186. In other embodiments, tensioning system 130 could include fewer than five tensile strands. In still other embodiments, tensioning system 130 could include more than five tensile strands.

Referring to FIG. 3, a representative second tensile strand 182 includes first portion 190, second portion 192, and third portion 191. Moreover, second portion 192 may be disposed between first portion 190 and third portion 194.

In different embodiments, two or more tensile strands could vary in one or more properties. In some embodiments, a first tensile strand and a second tensile strand could be substantially similar in materials and/or dimensions. In other embodiments, however, a first tensile strand and a second tensile strand could differ in material and/or dimensions. For example, the exemplary embodiment depicts first tensile strand 160 that is much longer than any of the plurality of secondary tensile strands 180. Further, as best seen in the enlarged view of FIG. 3, first tensile strand 160 may have a larger diameter than second tensile strand 182, which is a representative tensile strand of plurality of secondary tensile strands 180. In particular, in some embodiments, each of the tensile strands of plurality of secondary tensile strands 180 may have a similar diameter.

In some embodiments, first tensile strand 160 may also be made of a different material than second tensile strand 182. For example, in some embodiments, first tensile strand 160 could be made of nylon, while second tensile strand 182 could be made of a high-strength material such as Vectran. Using this combination of materials could allow for slightly more give and durability in first tensile strand 160, which may be subjected to stresses in many different directions. In other embodiments, however, first tensile strand 160 and second tensile strand 182 could be made of similar materials that impart similar physical properties including similar strength, stretch, and durability.

Optionally, in some embodiments, a tensile strand may be encased in a coating, such as a PTFE coating, that allows the tensile strand to be pulled or pushed smoothly through a tunnel and/or against a surface such as an upper with minimal resistance. It is also contemplated that in some other embodiments, some portions of plurality of secondary tensile strands 180 could be laminated, covered, or embedded within a layer of TPU or other polymer material that may help bond plurality of secondary tensile strands 180 to an upper along their length.

Referring back to FIG. 1, in the assembled article 100, tubular structure 140 extends along a contoured path on outer surface 105 of upper 102. Specifically, first end 142 of tubular structure 140 begins in heel portion 14 on medial side 18, extends through midfoot portion 12 and forefoot portion 10 on medial side 18 and then crosses to lateral side 16 at the front of article 100. From the front on lateral side 16, tubular structure 140 extends through forefoot portion 10 and midfoot portion 12, and into heel portion 14 on lateral side 16. Second end 144 is disposed in heel portion 14. For purposes of illustration, the portions of tubular structure 140 on lateral side 16 are shown in phantom in FIG. 1.

In some embodiments, tubular structure 140 may be attached to an underlying portion of upper 102. As an example, the enlarged cross-sectional view in FIG. 1 illustrates how portion 149 of outer surface 143 of tubular structure 140 may be in contact with, and attached to, upper 102. In some embodiments, tubular structure 140 may be attached to upper 102 along the entire length of tubular structure 140 (e.g., tubular structure may be continuously connected with upper 102). Thus, for example, first end 142, second end 144 and intermediate portion 146 may all be attached directly to upper 102. In other embodiments, however, tubular structure 140 could be attached to upper 102 at two or more non-continuous sections.

Generally, tubular structure 140 could be attached to upper 102 in any manner. Exemplary methods of attachment could include, but are not limited to, adhesive methods, stitching, stapling, the use of various fastening elements as well as possibly other methods. In an exemplary embodiment, tubular structure 140 could be formed by a three-dimensional printing process and formed directly onto upper 102. In such a process, tubular structure 140 could be made of a printable material capable of bonding with the surface of upper 102 during or after printing. Such an exemplary process is discussed in further detail below.

First tensile strand 160 may extend through tubular structure 140. Specifically, first tensile strand 160 may extend through tunnel 141 of tubular structure 140.

Plurality of secondary tensile strands 180 may be arranged to engage with first tensile strand 160 and provide a means of transferring tension between first tensile strand 160 and one or more other regions of article 100. As best seen in FIG. 3, second portion 192 of second tensile strand 182 may wrap around or over first tensile strand 160, thereby engaging first tensile strand 160. Further, first portion 190 and third portion 191 of second tensile strand 182 may be attached to first attachment region 300 and second attachment region 302, respectively, on article 100. In other embodiments, one or more ends of second tensile strand 182 could be joined to first tensile strand 160, for example, using a knot or intermediate connector.

In the exemplary embodiment of FIG. 3, first attachment region 300 and second attachment region 302 are regions of sole structure 110. Thus, second tensile strand 182 acts to connect first tensile strand 160 to sole structure 110. In other embodiments, however, a tensile strand could be attached to a region on upper 102. Such arrangements allow second tensile strand 182 to transfer tension between first tensile strand 160 and one or more attachment regions associated with either upper 102 or sole structure 110.

Figure 4:
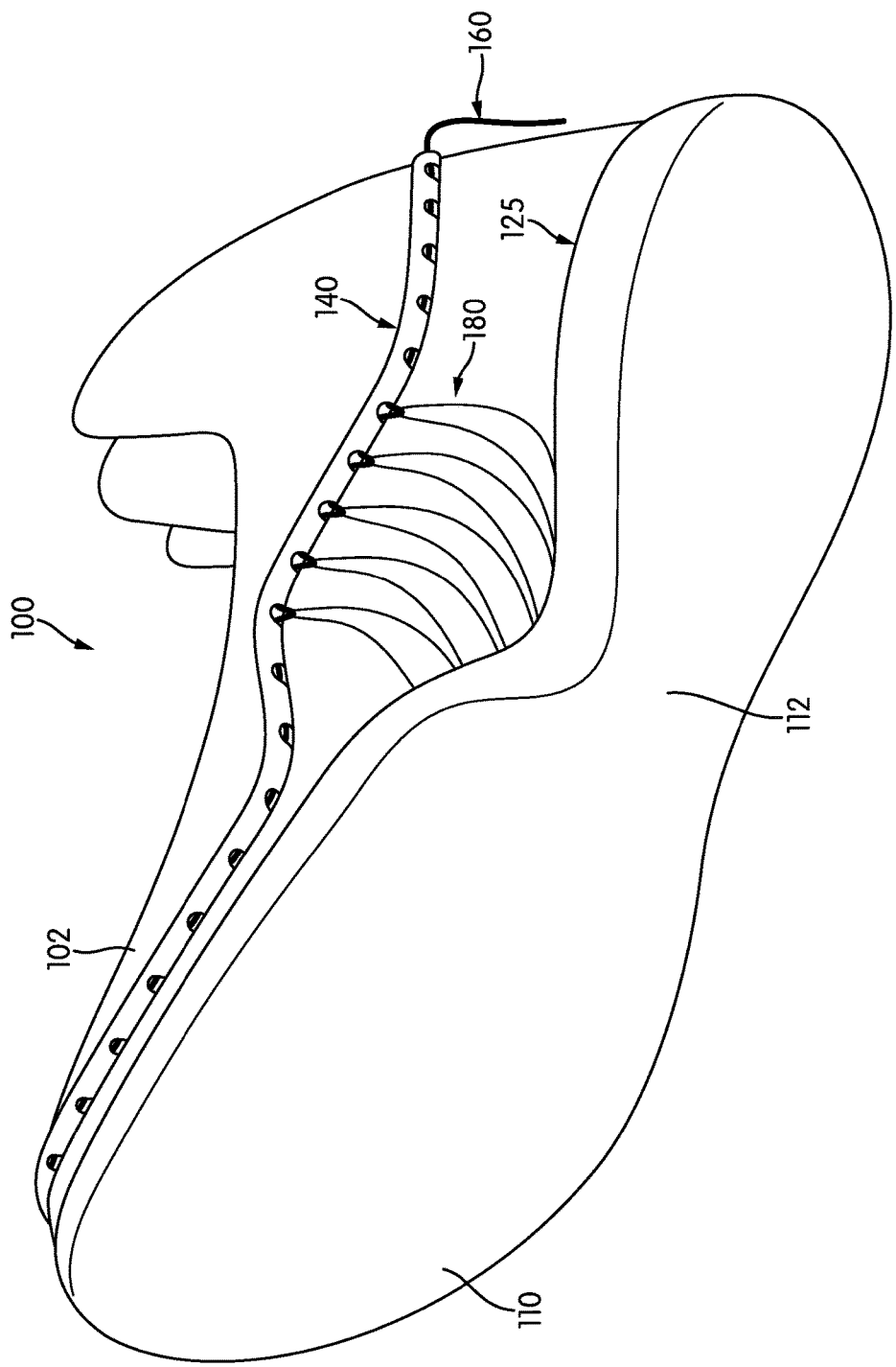
FIG. 4 is a schematic bottom isometric view of the article of footwear of FIG. 1.

FIG. 4 illustrates a bottom isometric view of article 100. Referring to FIGS. 1-4, the exemplary embodiment provides a configuration for supporting the arch of the foot. Moreover, the additional arch support provided by tensioning system 130 allows sole structure 110 to be constructed with a narrower midfoot portion 112, which may help reduce the weight of sole structure 110 and article 100.

As best seen in FIGS. 3-4, each tensile strand in plurality of secondary tensile strands 180 is anchored at, or near, bite line 125. In some embodiments, plurality of secondary tensile strands 180 may be attached directly to sole structure 110. In other embodiments, plurality of secondary tensile strands 180 could be attached on upper 102 at a portion of upper 102 that is attached to sole structure 110.

Figure 5:
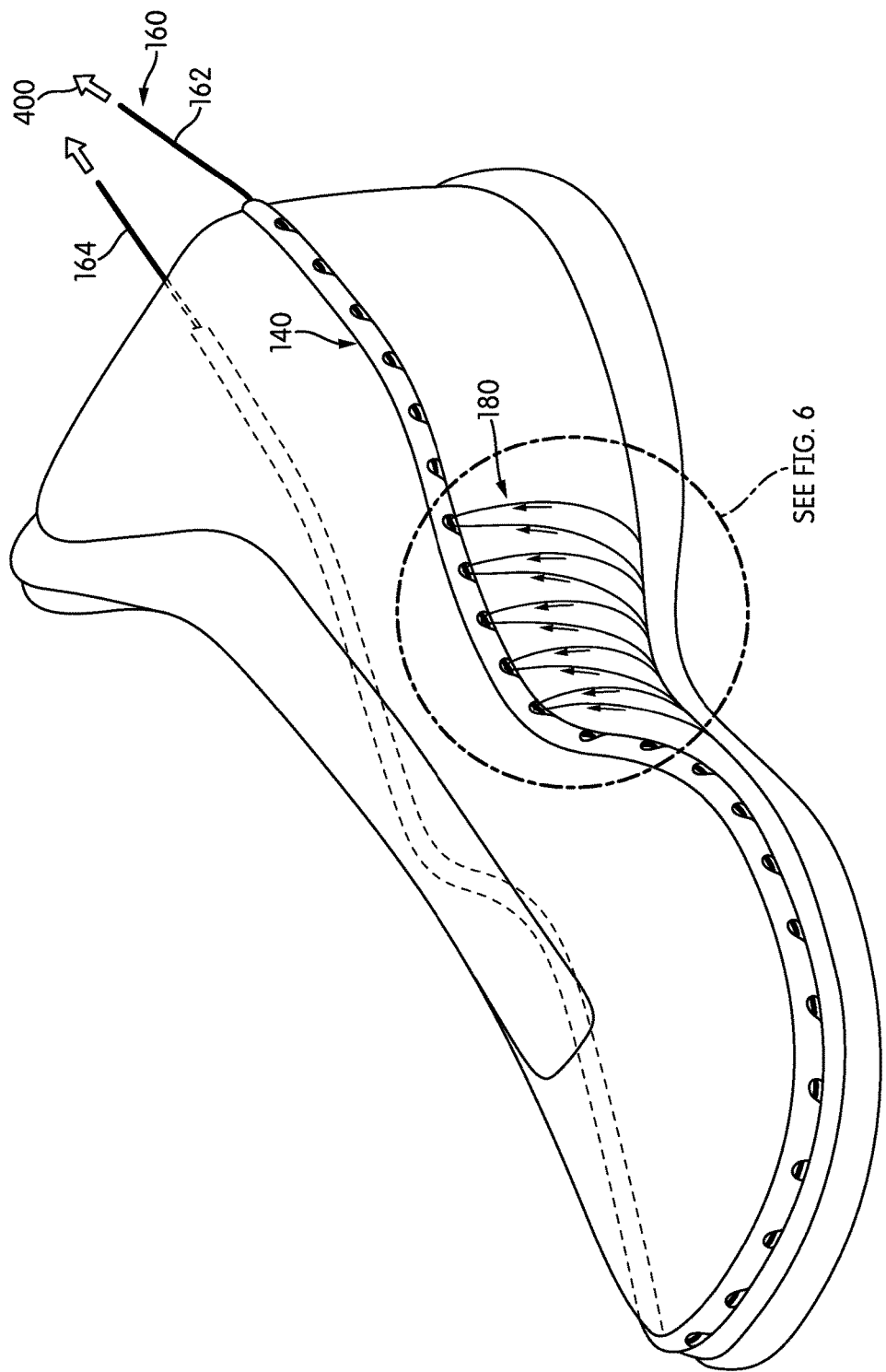
FIG. 5 is a schematic isometric view of the article of footwear of FIG. 1 as tension is applied along a tensile strand.
Figure 6:
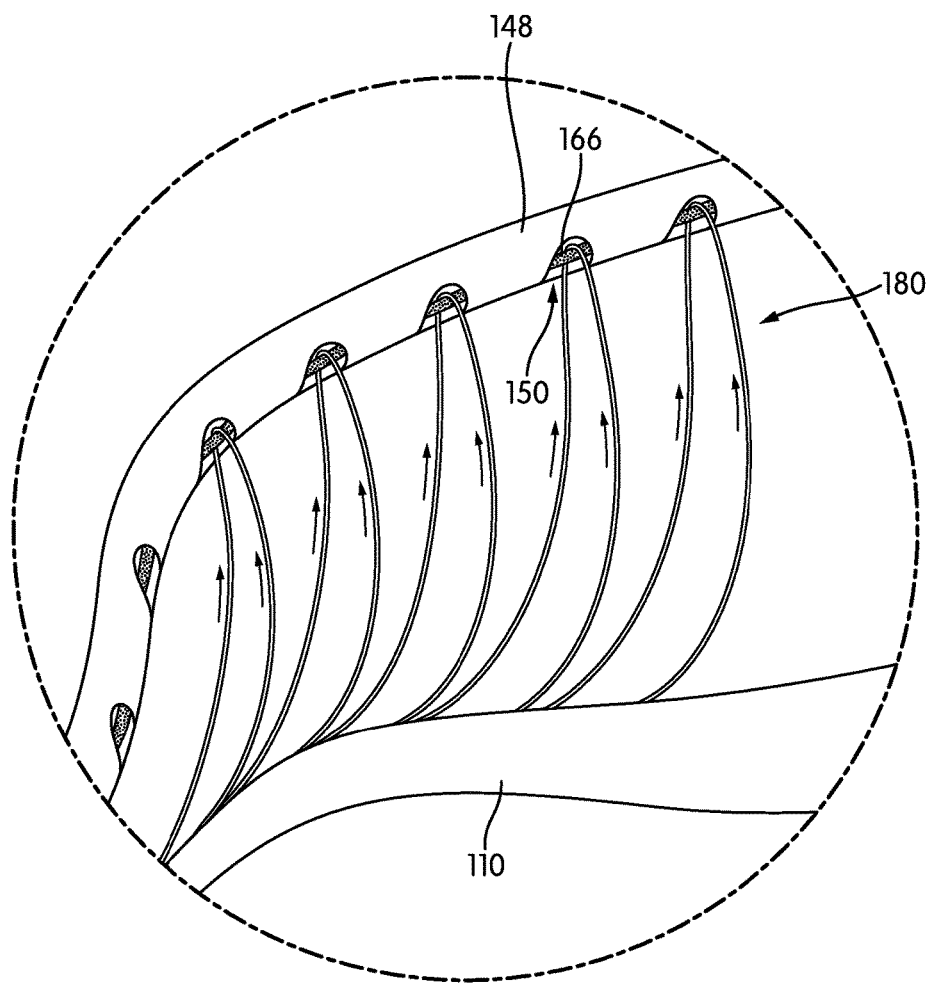
FIG. 6 is a schematic enlarged view of a portion of the article of footwear of FIG. 1 as tension is applied along a tensile strand.

FIGS. 5 and 6 illustrate an isometric view of article 100, and an enlarged view of a portion of article 100, respectively, as first tensile strand 160 is pulled to tighten article 100. Referring to FIGS. 5 and 6, tensioning force 400 is applied to first end portion 162 and second end portion 164 of first tensile strand 160. This results in first tensile strand 160 being pulled taut within tubular structure 140. As intermediate portion 166 of first tensile strand 160 within tubular structure 140 is pulled taut, plurality of secondary tensile strands 180 is pulled into plurality of openings 150 (e.g., second tensile strand 182 is pulled into first opening 152). Thus, tension is created across plurality of secondary tensile strands 180, between first tensile strand 160 (and tubular structure 140) and sole structure 110. This tension provides increased support to the arch of the foot on medial side 18.

Various other arrangements of secondary tensile strands are possible in other embodiments. In some embodiments, tensile strands may extend from a tubular structure to a bite line (as in FIGS. 1-6). In other embodiments, tensile strands could extend between two different portions of a tubular structure, or between two separate tubular structures. Moreover, some embodiments can be configured with a combination of tensile strands that extend to the bite line or across the upper to other portions of a tubular structure. In still other embodiments, one or more portions of a secondary tensile strand could be attached directly to a portion of an upper, using, for example, a laminate layer to bond the tensile strand to the upper, or using various kinds of welds.

Figure 7:
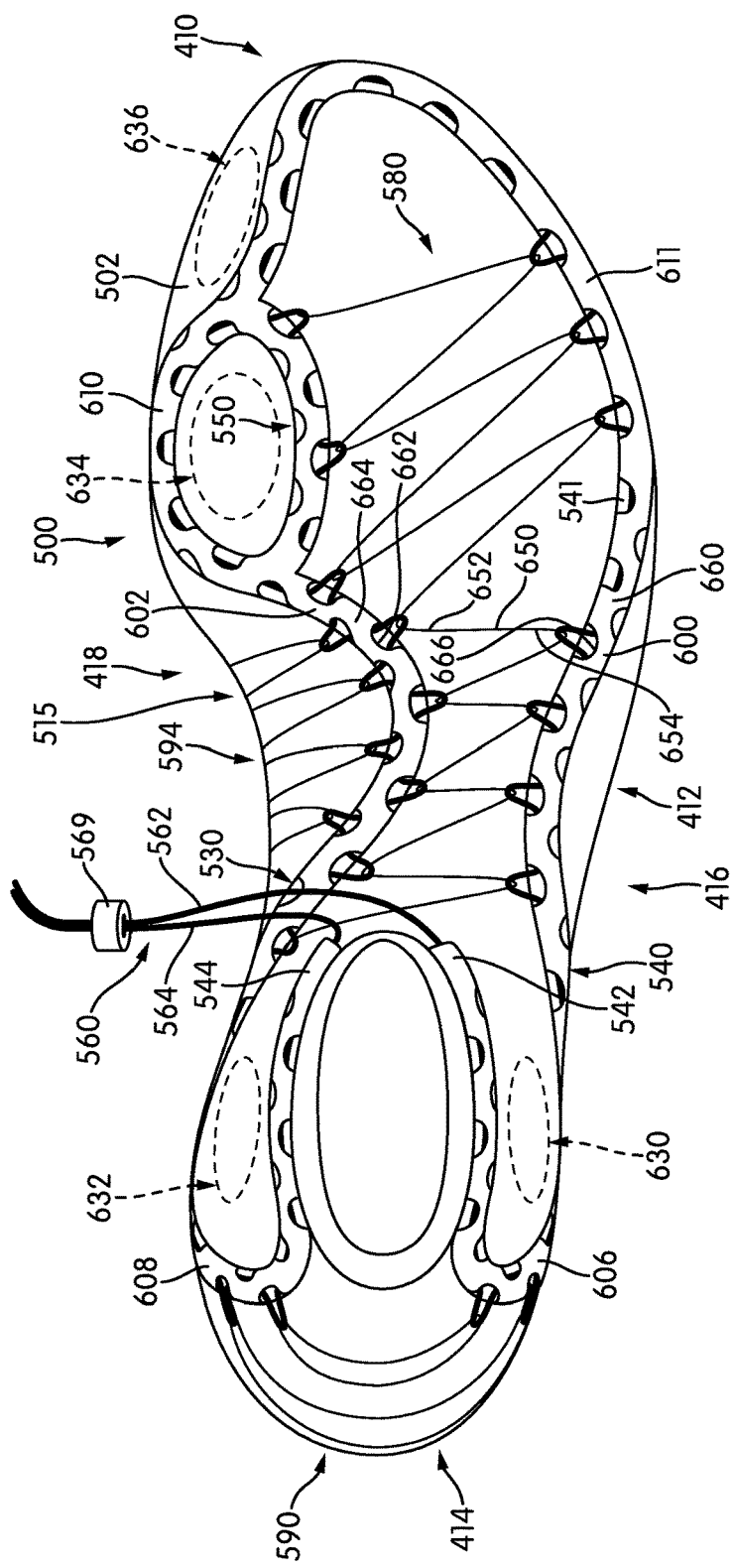
FIG. 7 is a schematic top down view of an embodiment of an article of footwear including a tubular structure.
Figure 8:
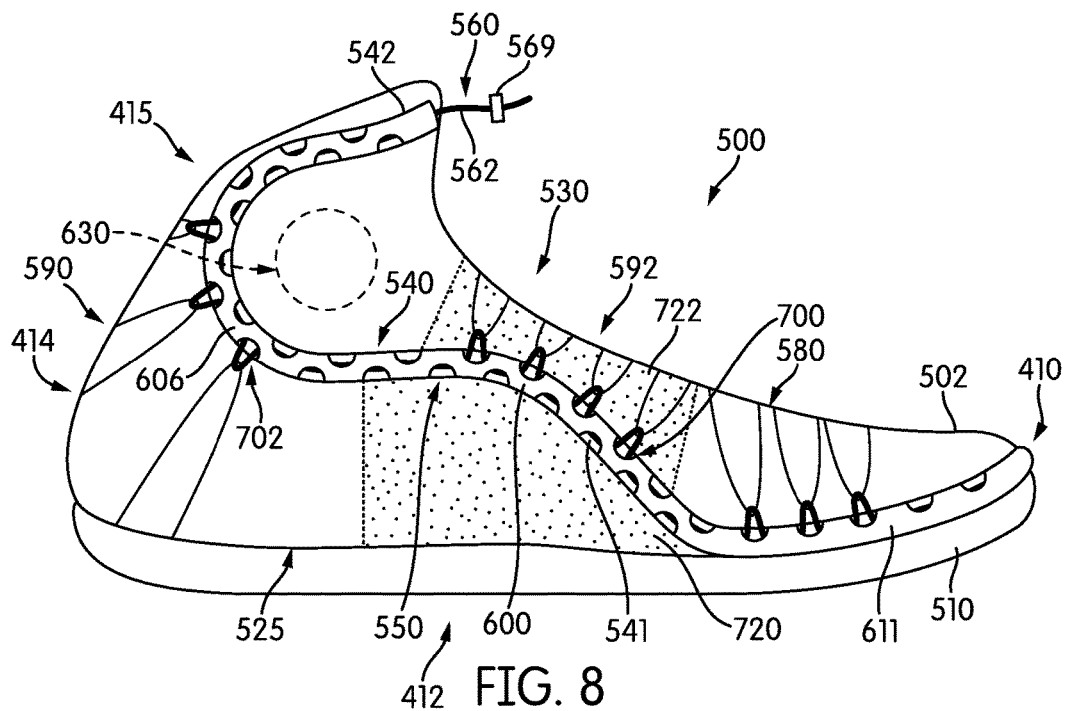
FIG. 8 is a schematic side view of the article of footwear of FIG. 7 in a relaxed state.
Figure 9:
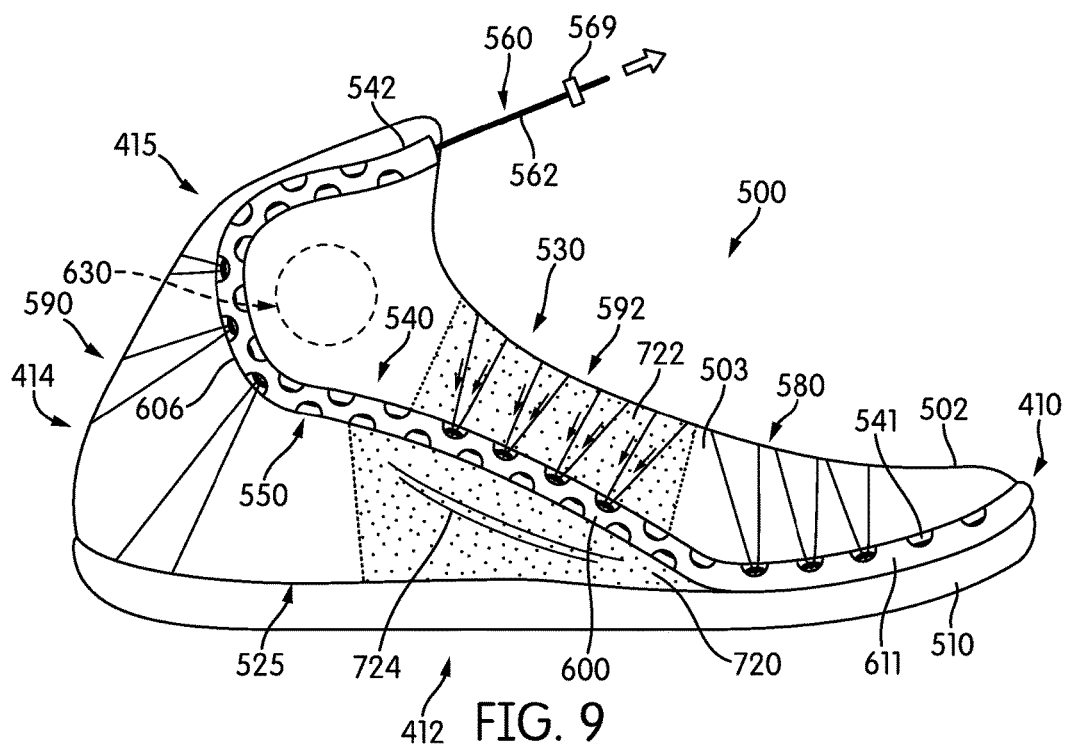
FIG. 9 is a schematic side view of the article of footwear of FIG. 7 in a tensioned state.

FIGS. 7-9 illustrate views of another embodiment of an article of footwear 500 (also referred to as article 500) with tensioning system 530. FIG. 7 illustrates a top view of article 500, while FIGS. 8-9 illustrate side views of article 500, corresponding to non-tensioned (FIG. 8) and tensioned (FIG. 9) configurations of article 500.

Article 500 may be provided with some similar provisions to article 100 of a previous embodiment. For example, article 500 includes upper 502 and sole structure 510, which are joined at bite line 525. Upper 502 and sole structure 510 could be configured in any way as discussed above for upper 102 and sole structure 110 of the embodiment shown in FIGS. 1-6.

For purposes of reference, article 500 may be associated with similar portions and/or directional terms as used in discussing article 100. For example, article 500 includes forefoot portion 410, midfoot portion 412, heel portion 414, and ankle portion 415. Further, article 500 includes lateral side 416 and medial side 418.

Article 500 further includes tensioning system 530, which may include at least some similar components to tensioning system 130 discussed above and shown in FIGS. 1-6. Specifically, tensioning system 530 includes tubular structure 540, first tensile strand 560 and plurality of secondary tensile strands 580. The tubular structure and tensile strands may have any of the properties discussed above for tubular structure 140, first tensile strand 160, and plurality of secondary tensile strands 180.

As seen in FIGS. 7-9, tubular structure 540 may be arranged on upper 502. Tubular structure 540 may include first end 542, second end 544, and various intermediate portions to be discussed in further detail below. First tensile strand 560 extends through tunnel 541 of tubular structure 540. First end portion 562 and second end portion 564 of first tensile strand 560 exit first end 542 and second end 544, respectively, of tubular structure 540.

Tubular structure 540 includes plurality of openings 550. Portions of first tensile strand 560 may extend outwardly through plurality of openings 550 and may be engaged by plurality of secondary tensile strands 580 at various portions along tubular structure 540. In contrast to the previous embodiment of FIGS. 1-6 where secondary tensile strands were provided at a single portion of tubular structure 540, the present embodiment of FIGS. 7-9 incorporates secondary tensile strands along multiple different portions of tubular structure 540.

Tubular structure 540 has a contoured path on upper 502. Starting on lateral side 416 of heel portion 414, tubular structure 540 extends continuously on lateral side 416 through midfoot portion 412 and forefoot portion 410, around the front of upper 502, and then on medial side 418, ending in heel portion 414. The contoured path of tubular structure 540 incorporates various curved or non-linear portions that facilitate dynamic fit and comfort.

In some embodiments, portions of a tubular structure may be contoured to create dynamic support to one or more portions of a foot. For example, tubular structure 540 includes first curved portion 600 on lateral side 416 (an intermediate portion on the lateral side), which is approximately disposed through midfoot portion 412 of article 500. First curved portion 600 is seen to curve away from bite line 525. Second curved portion 602 is disposed on medial side 418 (an intermediate portion on the medial side) and similarly curves away from bite line 525. The placement and geometry of these portions may facilitate a dynamic fit for article 500, especially when used in combination with one or more secondary tensile strands.

In some embodiments, portions of a tubular structure may be contoured to enhance comfort, for example, by passing around (rather than over or through) bony regions of an upper. As used herein, the term "bony region" refers to any region or portion of an upper that is in contact with, or proximate, a bony structure of a foot when the article is worn. Exemplary bony structures in the foot include structures of the metatarsal bones, structures of the calcaneus bone, as well as structures associated with the ankle, such as the lateral malleolus, the medial malleolus, and the posterior malleolus. Since applying forces directly against some bony structures of the foot can increase discomfort, it may be desirable to avoid placing a tubular structure across a bony structure (i.e., within a bony region of the upper).

More generally, embodiments can include provisions for contouring a tubular structure to achieve any desired configuration relative to an anatomical portion of a foot. For example, tubular structure may be contoured in a manner that facilitates support to the arch of the foot. As another example, a tubular structure could be configured to pass around pressure points or hotspots on a foot, which may or may not be associated with bony structures.

Referring to FIGS. 7-9, the contoured geometry of tubular structure 540 includes several portions intended to avoid bony regions. Here, upper 502 includes first bony region 630 corresponding to the lateral malleolus of a foot, second bony region 632 corresponding to the medial malleolus of a foot, third bony region 634 corresponding to a first metatarsal bone of a foot and fourth bony region 636 corresponding to a phalanx of the big toe. To accommodate these bony structures, third curved portion 606 curves around a periphery of first bony region 630, and fourth curved portion 608 curves around a periphery of second bony region 632. Further, as seen in FIG. 7, tubular structure 540 includes looped portion 610 that surrounds the entire periphery of third bony region 634. Finally, tubular structure 540 curves along the periphery of fourth bony region 636 so as to pass between the big toe (hallux) and the rest of the foot.

Secondary tensile strands may be arranged on article 500 to facilitate a dynamic fit and/or to enhance the support of the upper adjacent a bony structure. Plurality of secondary tensile strands 580 may be further associated with several distinct groups of tensile strands. For example, first group of tensile strands 590 is disposed in heel portion 414, second group of tensile strands 592 is disposed over instep portion 503 (shown in FIG. 9) of upper 502, and third group of tensile strands 594 is disposed in midfoot portion 412 on medial side 418. Each group of secondary tensile strands attaches to first tensile strand 560 and provides the ability to vary the tension across these different regions of upper 502. It may be understood that the term "group of tensile strands" may refer to one or more tensile strands. In the embodiment shown in FIGS. 8 and 9, for example, second group of tensile strands 592 may comprise a single tensile strand that weaves back and forth across instep portion 503. In other embodiments, second group of tensile strands 592 could comprise two or more distinct tensile strands.

As best seen in FIG. 7, third group of tensile strands 594 may extend from first tensile strand 560 down to bite line 525, thereby enhancing support for the arch of the foot on medial side 418. The configuration of third group of tensile strands 594 and the support provided may be similar in many respects to the configuration of, and support provided by, plurality of secondary tensile strands 180 shown in FIGS. 1-6. As with the earlier embodiment, ends of each tensile strand in third group of tensile strands 594 may be attached directly to sole structure 510.

Some tensile strands may be configured to extend between different portions of a tubular structure. For example, first group of tensile strands 590 includes tensile strands extending from third curved portion 606 to fourth curved portion 608 of tubular structure 540, wrapping around the back and/or bottom side of heel portion 414 between these tubular portions. Similarly, second group of tensile strands 592 includes tensile strands extending from first curved portion 600 to second curved portion 602, extending over instep portion 503 (see FIGS. 7-9) in between these tubular portions. Second group of tensile strands 592 also includes tensile strands extending from looped portion 610 of tubular structure 540 to lateral forefoot portion 611 of tubular structure 540, which is disposed adjacent to bite line 525. These tensile strands extend over the top of forefoot portion 410.

Second group of tensile strands 592 includes second tensile strand 650 that extends between first curved portion 600 and second curved portion 602 of tubular structure 540. Here, first curved portion 600 includes first surface 660 with first opening 666 that extends into tunnel 541, and second curved portion 602 includes second surface 664 with second opening 662 that extends into tunnel 541. Second tensile strand 650 includes first portion 652 that engages first tensile strand 560 proximate second opening 662 (e.g., just inside, or outside, of opening 662). Second tensile strand 650 also includes second portion 654 that engages first tensile strand 560 proximate first opening 666. Moreover, in some embodiments, second tensile strand 650 continues to weave back and forth between first curved portion 600 and second curved portion 602, further engaging additional portions of first tensile strand 560 through more openings on the tubular portions. With this configuration, second tensile strand 650 is able to transmit tension between two different portions of first tensile strand 560, specifically a portion of first tensile strand 560 within first curved portion 600 and a portion of first tensile strand 560 within second curved portion 602.

In order to accommodate the various path directions of the secondary tensile strands, openings in a tubular structure may be provided with a variety of different orientations. For purposes of reference, a tubular structure may be associated with an axial direction, which extends along the length of the tubular structure, and a circumferential direction (e.g., an angular direction) that extends around the circumference of the tubular structure. To accommodate different path directions and locations for secondary tensile strands, a tubular structure may, therefore, include openings having different circumferential orientations. As used herein, the orientation of an opening refers to a direction normal to a center of the opening. As an example shown in FIG. 8, opening 700 of tubular structure 540 is open toward a top or instep portion 503 (see FIG. 9) of upper 502, while opening 702 of tubular structure 540 is open toward bite line 525 of article 500. Thus, opening 700 and opening 702 are clearly seen to have different circumferential orientations along tubular structure 540. Such variable orientations allow for the placement of secondary tensile strands extending in any desired direction across upper 502, including across the top of upper 502, beneath upper 502, and/or to bite line 525.

FIG. 9 illustrates a side view of article 500 as first tensile strand 560 is pulled, or tensioned. As seen in comparing FIGS. 8-10, during tensioning, at least some portions of tubular structure 540 undergo elastic deformation. In particular, the geometry or curvature of tubular structure 540 (along the axial direction) is changed with tension. This change in geometry is elastic since releasing the tension results in tubular structure 540 returning to its non-tensioned configuration (FIGS. 7-8).

The deformations in some portions of tubular structure 540 occur as first tensile strand 560 attempts to straighten under tension. Thus, in some portions of high curvature, first tensile strand 560 may apply forces to tubular structure 540 that act to straighten those portions. For example, first curved portion 600 of tubular structure 540 undergoes an elastic deformation that results in a slightly straighter configuration. This, along with the retraction of first tensile strand 560 into openings 550 acts to pull second group of tensile strands 592. As second curved portion 602 (not shown in FIG. 9) may undergo a similar straightening and pulling away from instep portion 503, second group of tensile strands 592 may be generally pulled down on instep portion 503, increasing support at instep portion 503. Additionally, third curved portion 606 undergoes an elastic deformation that pulls inwardly (e.g., toward a center of first bony region 630) on first group of tensile strands 590. This results in first group of tensile strands 590 pulling against the back, sides and bottom of the heel to enhance support.

Different portions of a tubular structure may undergo different changes in geometry. The degree and type of change in geometry may be controlled by various factors including, but not limited to, the non-tensioned geometry of the tube (e.g., straight or curved) and flexibility of the tube, as well as possibly other factors.

Because tubular structure 540 is attached directly to upper 502, tubular structure 540 applies forces to upper 502 as it deforms, which may result in changes in the upper geometry. Therefore, changes in support and fit of the upper as tensioning system 530 is adjusted result not only from adjusting the tension of secondary tensile strands but also from changing the upper geometry as tubular structure 540 undergoes elastic deformation.

For purposes of characterizing upper 502, upper may be considered as having various base portions. A base portion is a local portion of the region of the upper that may or may not be continuous with adjacent portions or regions. A base portion may further be characterized as having a geometry. As used herein, the geometry of a base portion, or base layer, includes the surface area and the geometry of the surface. Base portions may have flat geometries, may be smoothly curved or may be highly curved. Regions of high curvature in the surface of a base portion or layer may be characterized as folds or pinched portions. Because the layers of an upper may be made of fabrics or textiles having a high degree of flexibility, an upper or portions of the upper may undergo significant changes in geometry, including changing from a relatively flat geometry to a geometry with one or more folds. In some embodiments, the surface area of a base portion could change without significant changes to the surface curvature or contouring. This may occur when the base portion is capable of expanding or compressing in a dimension parallel with the surface of the base portion (e.g., a rubber sheet can expand or compress horizontally inducing a change in surface area without significant changes from a flattened geometry). It may, therefore, be appreciated that as used herein, "change in geometry" could refer to increases or reductions in surface area without significant changes in curvature (e.g., without adding indentations, pinches, or folds to the surface).

As depicted in FIGS. 7-9, upper 502 may include several distinct base portions. First base portion 720 extends in midfoot portion 412, from first curved portion 600 of tubular structure 540 down to bite line 525. A second base portion 722 extends through midfoot portion 412, between first curved portion 600 and second curved portion 602 (e.g., across instep portion 503). FIGS. 7-8 depict an initial geometry for first base portion 720 and second base portion 722. As tension is applied via first tensile strand 560 (shown in FIG. 9), tubular structure 540 deforms and applies forces to the boundaries of both first base portion 720 and second base portion 722. The resulting deformation acts to increase the geometry of second base portion 722, as first curved portion 600 and second curved portion 602 pull the edges of second base portion 722 apart. Thus, the surface area of second base portion 722 may generally be increased, and some slight changes in contouring may also occur as second base portion 722 accommodates a slightly different portion of the foot. In contrast, as first curved portion 600 deforms, first base portion 720 contracts slightly, as the upper boundary of first base portion 720 is moved closer to a lower boundary at bite line 525. In the exemplary embodiment, this change in the boundary locations of first base portion 720 induces small ridge 724 (e.g., a local change in the otherwise flat geometry of first base portion 720). Thus, first base portion 720 clearly changes in geometry as article 500 is tensioned. The resulting changes may provide enhanced fit across upper 502 in second base portion 722 (i.e., along part of instep portion 503), while relaxing the fit on upper 502 in first base portion 720.

It will be appreciated that depending on the configuration of the tubular structure and one or more secondary tensile strands, some portions of upper 502 may not undergo any significant changes in geometry (and therefore fit) as tension is applied to first tensile strand 560. Moreover, as discussed above, it is contemplated that base portions could undergo significant changes in geometry without introducing highly curved features (such as ridges, indentations, pinches, or folds)—e.g., by using elastic fabrics or textiles that are pre-stretched in an un-tensioned state of the article, such that deformations in tube geometry result in mere contraction or further expansion without affecting surface curvature.

Figure 10:
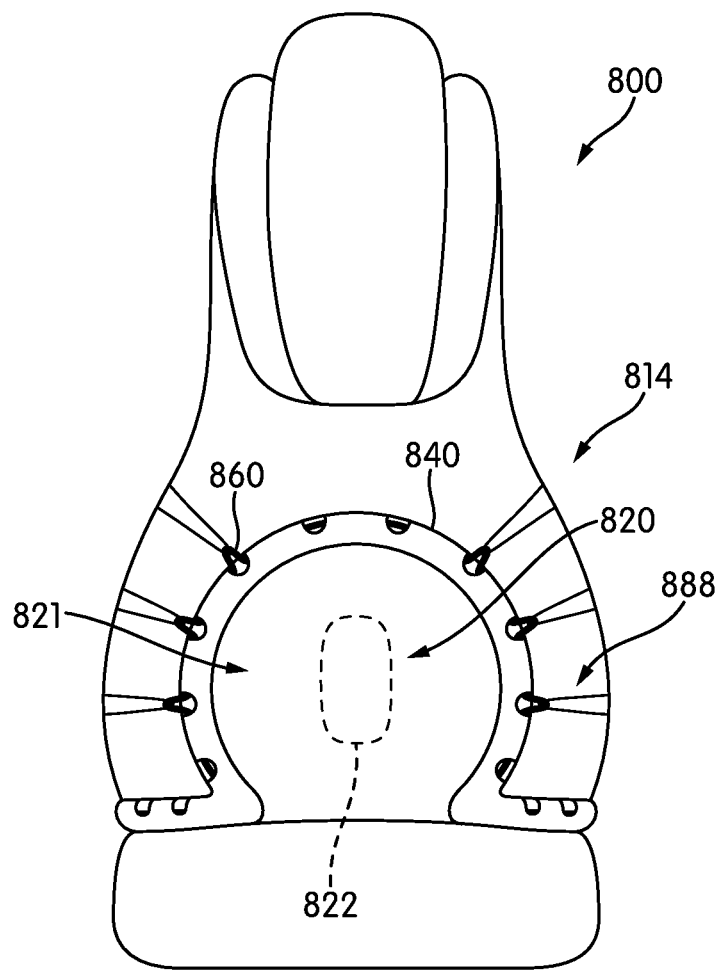
FIG. 10 is a schematic rear view of the article of footwear of FIG. 7.

FIG. 10 illustrates an exemplary embodiment of another embodiment of an article of footwear 800 (or article 800), which illustrates a tubular geometry configured to provide enhanced comfort at a bony region associated with the calcaneus bone. It will be appreciated that article 800 may incorporate any of the provisions previously discussed in the previous embodiments and shown in FIGS. 1-9. Such similar provisions may be discussed without introduction in discussing this embodiment.

Referring to FIG. 10, tubular structure 840 has an approximately circular or rounded geometry and passes around periphery 821 of bony region 820, which corresponds to the calcaneus bone. In FIG. 10, the approximate location of the furthest protruding feature 822 of the calcaneus bone is depicted in phantom. Thus, the path of tubular structure 840 in heel region 814 is selected to avoid applying pressure directly against the calcaneus, especially in the vicinity of protruding feature 822. Secondary tensile strands 888 engage first tensile strand 860 and extend radially outwardly from a center of bony region 820. Thus, when tensioned, secondary tensile strands 888 may help keep tubular structure 840 from deforming into bony region 820 and thereby causing discomfort.

The embodiments disclosed in FIGS. 1-10 illustrate tubular structures that are generally continuous with openings placed at various locations along the tubular structure. It may be appreciated that other embodiments are not limited to this specific class of geometries and may incorporate other geometries for tube-like structures that facilitate the operation of a tensioning system along an upper. For example, some other embodiments could incorporate more discrete tubular segments that are joined by relatively narrow connecting portions. Such an alternative embodiment is depicted in FIGS. 11-12.

FIG. 11 depicts an embodiment of article 870 including tensioning system 873 with tunnel spring structure 880. Here, tunnel spring structure 880 extends in a contoured path over upper 883. FIG. 12 depicts article 870 in a tensioned state. Tunnel spring structure 880 includes plurality of individual tubular structures 882 that are joined by connecting portions 884. For example, first tubular structure 885 is connected to second tubular structure 886 by intermediate connecting portion 887. More specifically, first tubular structure 885 includes first end 891 and second end 892 and a tunnel portion (not visible) extending between first end 891 and second end 892. Likewise, second tubular structure 886 includes third end 893 and fourth end 894 as well as a tunnel portion (not visible) extending between third end 893 and fourth end 894. Thus, intermediate connecting portion 887 is seen to be attached at second end 892 of first tubular structure 885 and third end 893 of second tubular structure 886, thereby joining the structures. In this embodiment, each separate tubular structure has a tunnel portion and by joining the tubular structures together with connecting portions the tunnel portions together form a tunnel extending from a first end to a second end of the tunnel spring structure 880.

Figure 13:
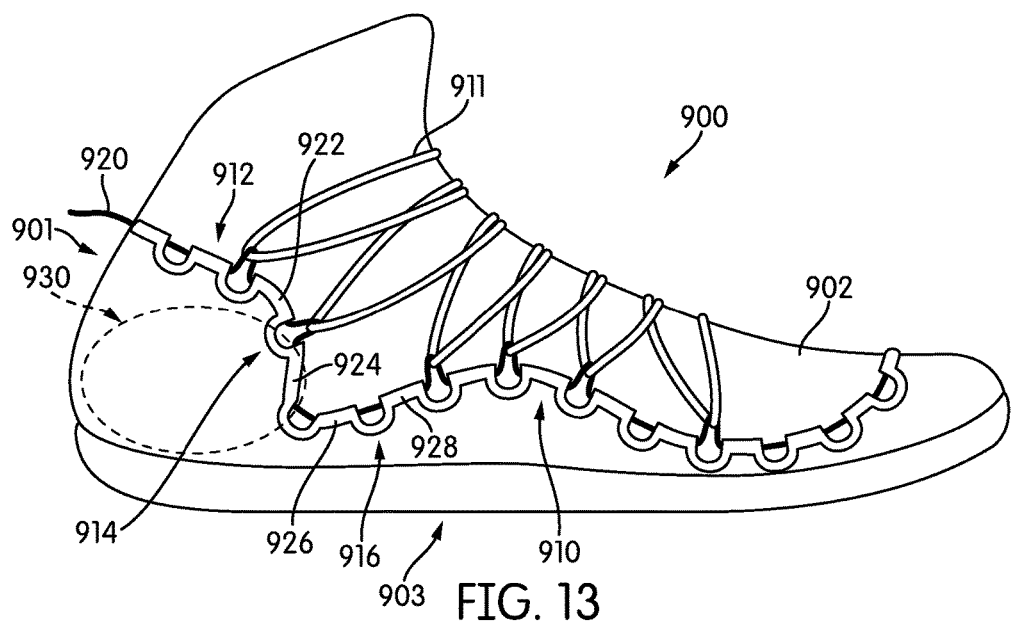
FIG. 13 is a schematic side view of an embodiment of an article of footwear with a tubular structure in the form of a tunnel spring structure.

In the embodiment shown in FIGS. 12-13, intermediate connecting portion 887 may generally have a small circumferential dimension. Specifically, embodiments may include connecting portions with circumferential dimensions in the range between 5 and 40 percent of the total circumference of each tubular structure.

The embodiments may make use of any of the tunnel spring structures disclosed in U.S. Patent Application No. 62/263,923, filed Dec. 7, 2015, titled "Tunnel Spring Structures," which is herein incorporated by reference in its entirety and hereafter referred to as the "tunnel spring application."

In contrast to the tubular structures depicted in FIGS. 1-10, tunnel spring structure 880 is capable of flexing (e.g., contracting or expanding in length) along an axial direction. This flexing can occur as connecting portions 884 deform under tension applied across tensile strand 881, thereby allowing adjacent tubular structures to move closer together. Such a configuration may allow for slightly different dynamics on an upper than in cases where the tubular structure has a fixed axial length. It is also to be appreciated that such tunnel spring structures may also be more easily flexed in other directions beyond the axial direction. In other words, the tunnel spring structures may flex and bend more easily than other configurations of a tubular structure. In some cases, tunnel spring structures may also tend to return to a default position after tension is released as the connecting portions of the tunnel spring structure may act to urge adjacent tubular structures apart and toward a default spacing of tubular structures.

Referring to FIGS. 11 and 12, as tension is applied along tensile strand 881 (e.g., when a user pulls tensile strand 881), tunnel spring structure 880 may deform. In contrast to some other embodiments with openings that do not sufficiently change the structural properties of the tubular structure, the structural properties of tunnel spring structure 880 are strongly influenced by the geometry of the connecting portions and the large openings, or gaps, between adjacent tubular structures. For example, as tension is applied along tensile strand 881, the tubular structures in tunnel spring structure 880 may collapse toward one another as their respective connecting portions undergo deformation. Thus, in some cases, the spacing between adjacent tubular structures may vary between non-tensioned states (FIG. 11) and tensioned states (FIG. 12). For example, first tubular structure 885 and second tubular structure 886 are seen to move closer to one another between the non-tensioned state of FIG. 11 and the tensioned state of FIG. 12, as intermediate connecting portion 887 undergoes spring-like deformation.

In some cases, portions of tunnel spring structure 880 may be arranged so that as tension is applied to tensile strand 881, the portions may conform more closely to one or more anatomical features of a foot. In the exemplary embodiment of FIGS. 11-12, tunnel spring structure 880 includes adaptive portion 889, which can be seen as circumscribing the approximate region on upper 883 associated with the lateral malleolus 830. In this case, adaptive portion 889 is attached to upper 883 along a plurality of anchoring portions, which are the points of attachment between each individual tubular structure in tunnel spring structure 880 and upper 883 (e.g., a first anchoring portion may be defined as tubular structure 831, since first tubular structure 885 is directly attached to upper 883 and thereby helps to anchor tunnel spring structure 880 to upper 883).

Referring now to FIG. 12, as tensile strand 881 is tensioned, the tubular segments of adaptive portion 889 may collapse together and form a curved section of tunnel spring structure 880 that more closely conforms to lateral malleolus 830 and thereby provides continued support across the ankle on the lateral side without tunnel spring structure 880 passing directly over lateral malleolus 830.

Figure 14:
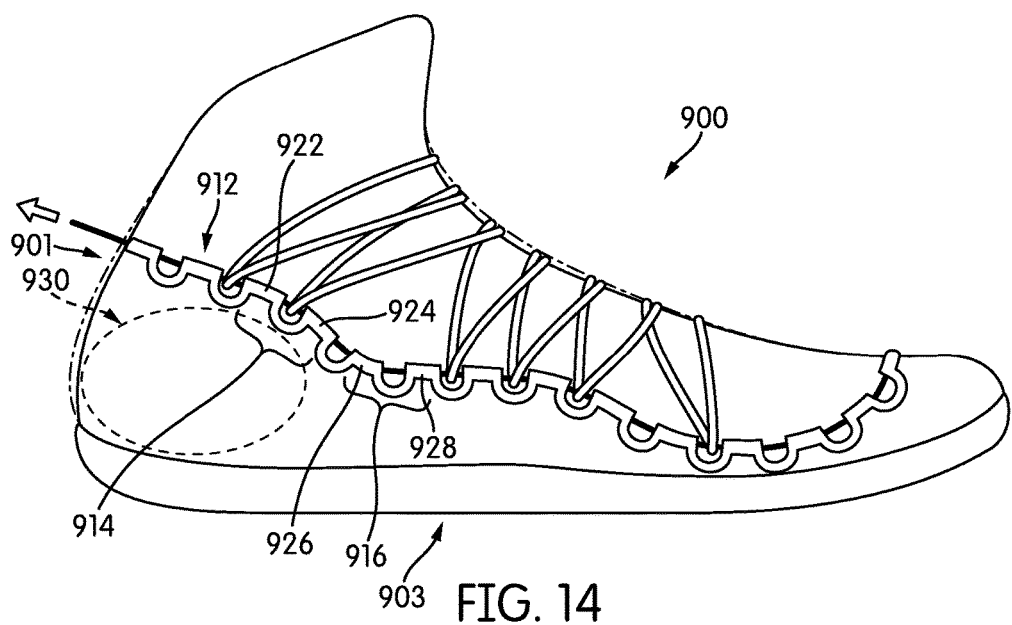
FIG. 14 is a side schematic view of an embodiment of an article of footwear with a tubular structure in the form of a tunnel spring structure as tension is applied along a tensile strand.

FIGS. 13-14 illustrate still another embodiment of an article of footwear 900 (or article 900) incorporating a tubular structure in the form of tunnel spring structure 910. As with previous embodiments, tunnel spring structure 910 may be attached directly to upper 902 of article 900. Further, tensile strand 920 may extend through a tunnel (comprised of the individual tunnel portions of each tubular structure) of tunnel spring structure 910. Tensile strand 920 may further engage with lace 911, which may be used to tighten the throat and/or opening of upper 902.

As shown in FIGS. 13-14, tunnel spring structure 910 includes adaptive portion 912 that extends adjacent heel portion 901 of article 900. For purposes of reference, the approximate location of calcaneus bone 930 is shown in phantom where it would be located when a foot is inserted into article 900. In the resting, or non-tensioned, state of FIG. 13, adaptive portion 912 has a default geometry in which it curves from a higher location at the back of heel portion 901 to a lower location as it moves forward of heel portion 901 and toward midfoot portion 903. Moreover, when no tension is applied, at least some of adaptive portion 912 may partially overlap, or lie over, with calcaneus bone 930 (e.g., some of adaptive portion 912 may be disposed outwardly, or distally, of calcaneus bone 930).

As tension is applied along tensile strand 920, which is shown in FIG. 14, adaptive portion 912 may deform so as to better conform to the anatomical feature of the foot associated with calcaneus bone 930. Specifically, adaptive portion 912 changes shape (i.e., takes on a conforming geometry) so as to circumscribe the periphery of the feature associated with calcaneus bone 930 without actually overlapping with the feature, which may help avoid discomfort that could be caused by having the tunnel spring structure apply an inwardly (or proximally) directed force against the part of the foot including calcaneus bone 930.

In some embodiments, an adaptive portion may be made to better conform to an anatomical feature during tensioning by controlling the location of two or more anchoring portions as well as the angle of tension applied across the anchoring portions. In the example of FIGS. 13-14, adaptive portion 912 may be seen to comprise first adaptive segment 914 (consisting of several tubular structures and their connecting portions) and second adaptive segment 916. First adaptive segment 914 includes multiple anchoring portions, comprised here of individual tubular structures, such as first tubular structure 922 and second tubular structure 924. Here, first adaptive segment 914 is seen to extend from first tubular structure 922 to second tubular structure 924, and includes a corresponding segment of tensile strand 920. Likewise, second adaptive segment 916 includes multiple anchoring portions, comprised here of individual tubular structures, such as third tubular structure 926 and fourth tubular structure 928. Here, second adaptive segment 916 is seen to extend from third tubular structure 926 to fourth tubular structure 928, and includes a corresponding segment of tensile strand 920. In the relaxed, or non-tensioned, state of tunnel spring structure 910, first adaptive segment 914 and second adaptive segment 916 form an angle (i.e., are not collinear). Thus, as tension is applied along tensile strand 920, as in FIG. 14, first adaptive segment 914 and second adaptive segment 916 deform so as to partially straighten and reduce the relative angle between them. This causes the curvature of adaptive portion 912 to become more rounded and pulls some tubular structures (e.g., tubular structure 924) away from the region of upper 902 directly overlying calcaneus bone 930.

Figure 15:
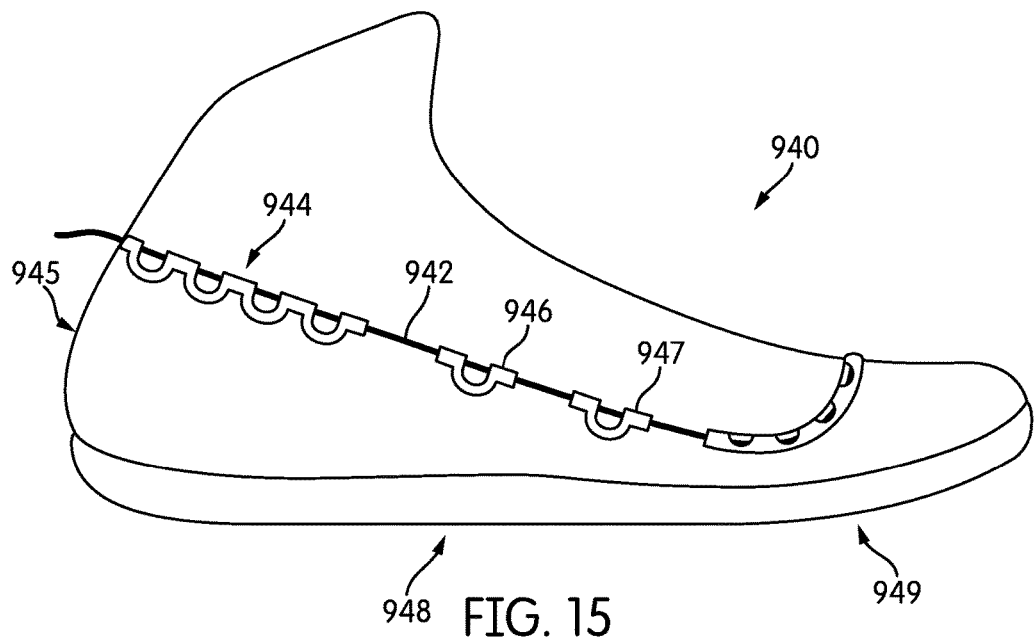
FIG. 15 is a schematic side view of an embodiment of an article of footwear including multiple types of tubular structures.

FIG. 15 illustrates yet another embodiment of article of footwear 940 (or article 940) with a tensioning system. In FIG. 15, the tensioning system includes multiple different kinds of tubular structures, which are all connected via a common tensile strand 942. For example, in FIG. 15, article 940 includes tunnel spring structure 944 extending along heel portion 945, as well as several segmented tubular structures (such as first segmented tubular structure 946 and second segmented tubular structure 947) extending through midfoot portion 948 and forefoot portion 949. As seen in FIG. 15, segmented tubular structures may be characterized by comprising just two tubular structures connected by a single connecting portion. In some cases, the segmented tubular structures may not tend to deform (especially the connecting portions) under applied tensions.

As seen in FIG. 15, tubular structures may not extend completely around a shoe, as is shown in other embodiments. In particular, in some cases, the use of tubular structures for controlling tension and contraction can be applied to localized regions of an article (for example structure 944 in heel portion 945 and a separate and distinct tubular structure 946 in midfoot portion 948). This arrangement may allow for fine tuning of tensioning and upper substrate contraction in various local regions associated with distinct tubular structures. Moreover, it can be appreciated that in any other embodiments disclosed herein and shown in the figures, the exemplary tubular structures could be separated into disjoint sections that are disposed across local regions (e.g., the arch, around the ankle bones, etc.).

The type of tubular structure used may be selected according to the desired properties for the overall tensioning system. For example, spring tunnel structures may be applied over portions or regions where it is desirable to have continuous tubular structures that can collapse and which also tend to return to an initial relaxed, or non-tensioned, state once the tension along a tensile strand has been removed. In contrast, in some cases, segmented tubular structures may be applied in regions where it is desirable to form complex paths for a tensile strand, including forming loops or other paths with crossovers or intersections that may be more difficult to achieve with continuous tubular structures. Embodiments may use any of the tubular structures, tunnel structures, or segmented tunnel structures disclosed in U.S. Patent Application No. 62/263,891, filed Dec. 7, 2015, titled "Segmented Tunnels on Articles," which is herein incorporated by reference in its entirety and hereafter referred to as the "segmented tunnels application."

Figure 16:
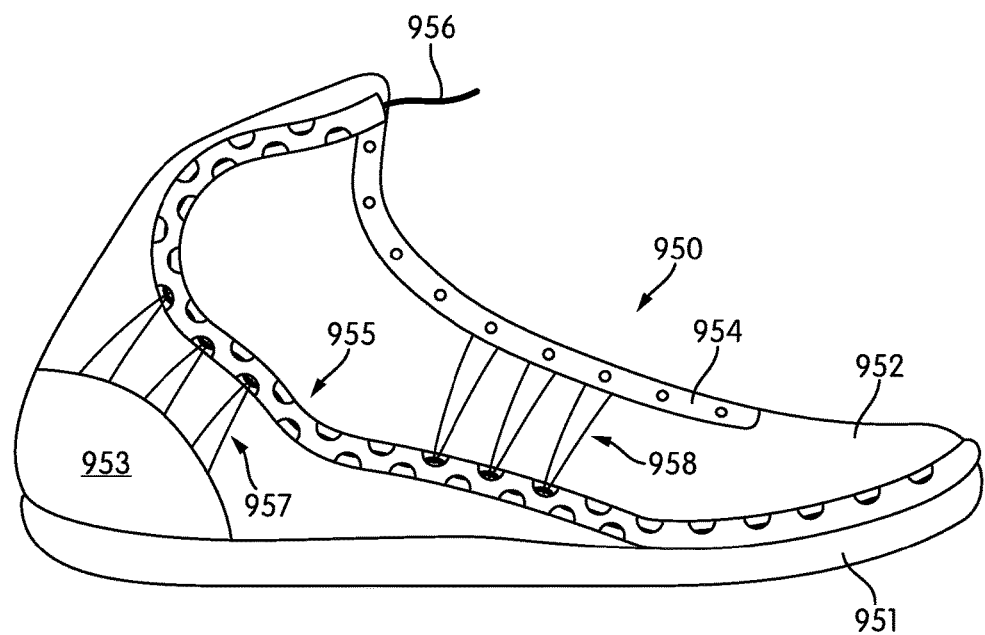
FIG. 16 is a schematic view of an embodiment of an article of footwear with a tubular structure, in which secondary tensile strands extend from the tubular structure and are anchored on a heel counter and a lace stay.

It may be appreciated that embodiments can include provisions for anchoring, or otherwise attaching, components of a tensioning system to different parts of an article of footwear. As previously discussed, in some cases tensile strands and/or tubular structures could be partially or fully anchored to a sole structure, or to portions of an upper directly adjacent the sole structure (e.g., at the bite line). However, it is also contemplated that in some other embodiments, components could be mounted to other structures of an article. For example, FIG. 16 illustrates another embodiment with an article 950 that comprises upper 952 and sole structure 951, and which further includes heel counter 953 and a fastening system with lace stay 954 (or eyestay). In the exemplary embodiment of FIG. 16, tubular structure 955 extends through upper 952 and includes primary tensile strand 956 engaged with secondary tensile strands 957 and tensile strands 958. In this case, secondary tensile strands 957 are seen to be anchored on heel counter 953. That is, at least one end of each of secondary tensile strands 957 are directly attached to heel counter 953. Likewise, tensile strands 958 are seen to be anchored on lace stay 954. That is, at least one end of each of tensile strands 958 are directly attached to lace stay 954. This arrangement may facilitate the transfer of tension applied along primary tensile strand 956 to other structures, such as heel counter 953 and lace stay 954, as well as vice versa (i.e., transferring tension from those structures back to tensile strand 956).

Of course, the embodiment of FIG. 16 is not intended to be limiting, and in other embodiments any tensile strands and/or portions of a tubular structure could be mounted, anchored, or otherwise attached to any structure associated with an article of footwear. Such structures include, but are not limited to, sole components (e.g., outsoles, midsoles, and/or insoles), upper components (e.g., various panels, meshes, tongues, etc.), fastening components (e.g., laces, lace stays, eyelets, etc.), supporting structures (e.g., heel counters, toe guards, heel cups, pads, etc.) as well as any other structures comprising an article of footwear.

Figure 17:
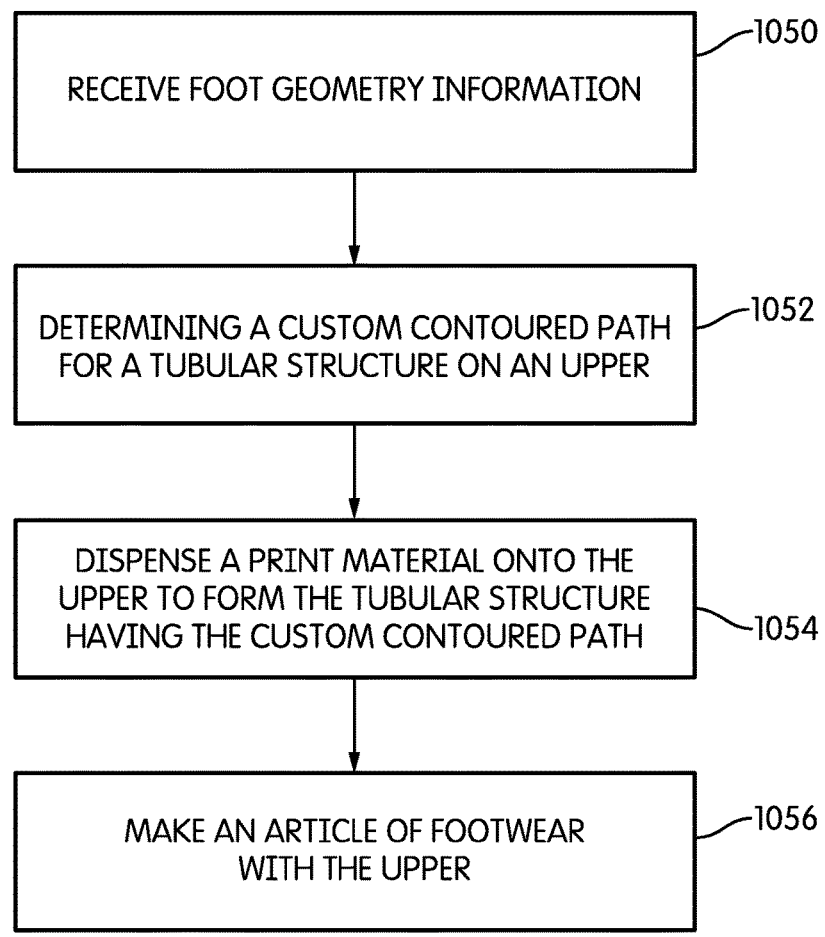
FIG. 17 is an embodiment of a process for forming articles of footwear with tubular structures in customized paths on a surface of the article.

FIG. 17 illustrates an exemplary process for manufacturing an article with a tensioning system according to the embodiments. It may be appreciated that in some embodiments, one or more steps may be optional, while in other embodiments the process could include additional steps. The method, therefore, may not be limited to the particular steps or order of steps discussed here. It may also be appreciated that one or more steps could be accomplished by one or more of the following: a manufacturer, retail worker, customer, and/or third party.

Figure 18:
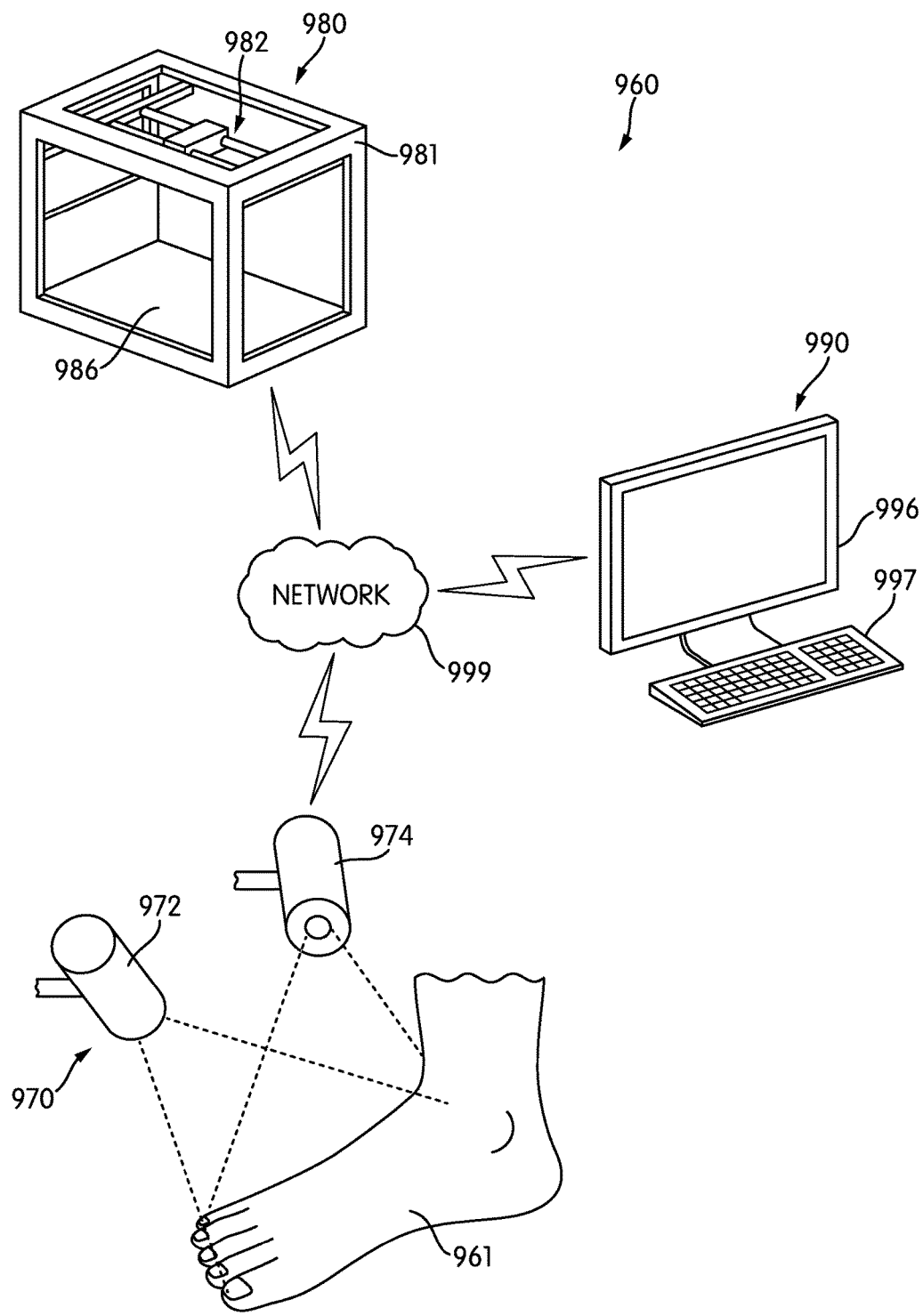
FIG. 18 is a schematic view of an embodiment of a customization system.
Figure 19:
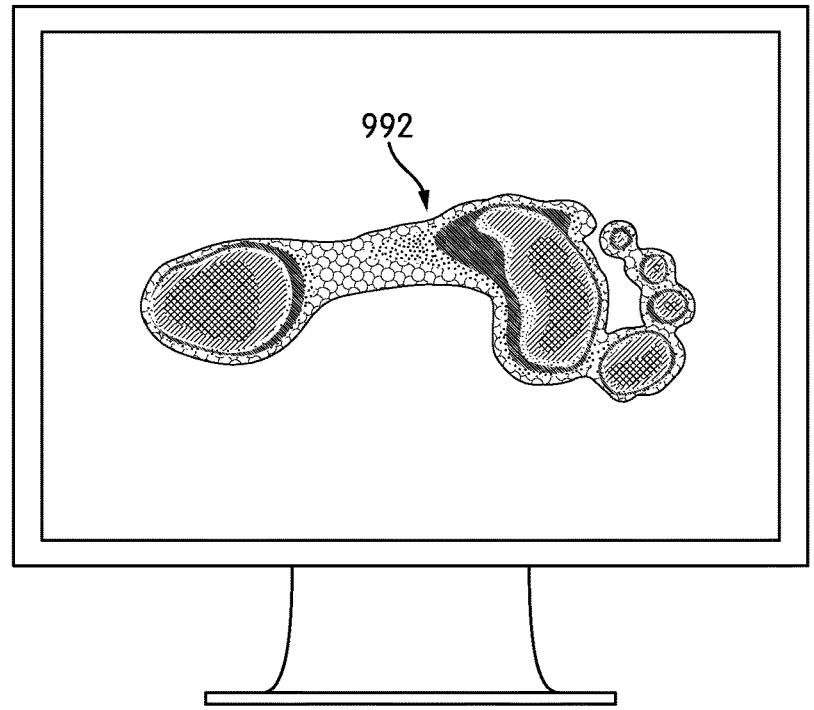
FIG. 19 is a schematic view of an embodiment of a foot scanning device and a pressure pattern detected by the foot scanning device.
Figure 19:
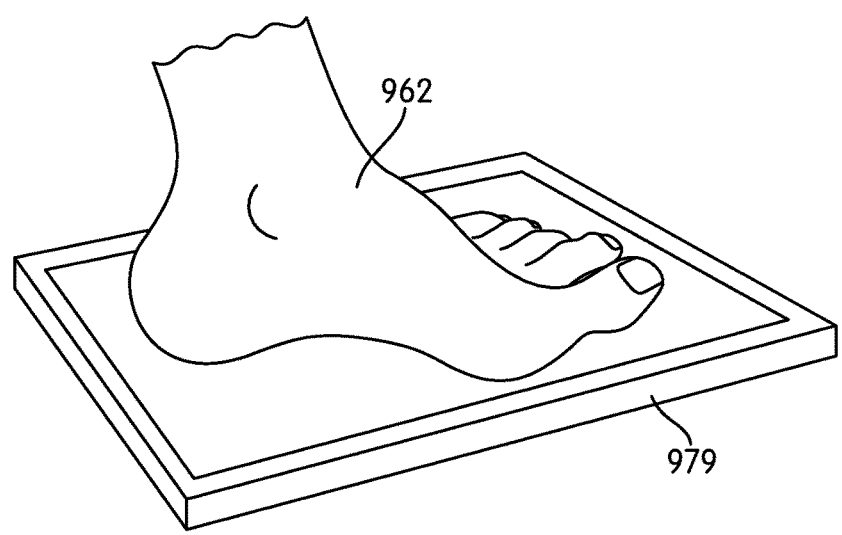
Figure 20:
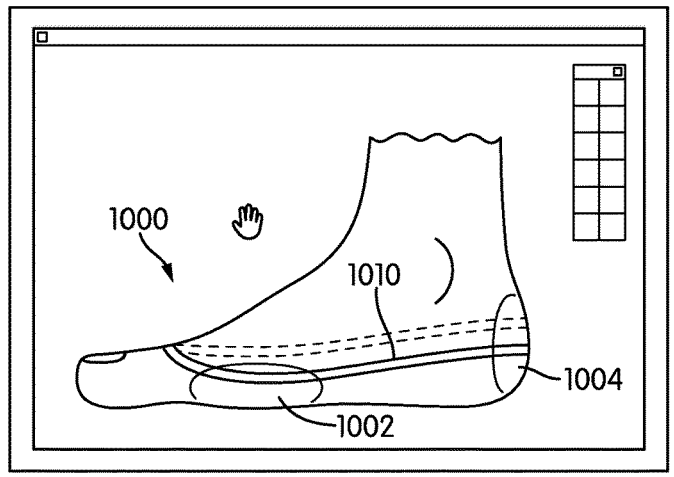
FIGS. 20-22 illustrate schematic views of steps of designing a customized path for a tubular structure on an article, according to an embodiment.
Figure 21:
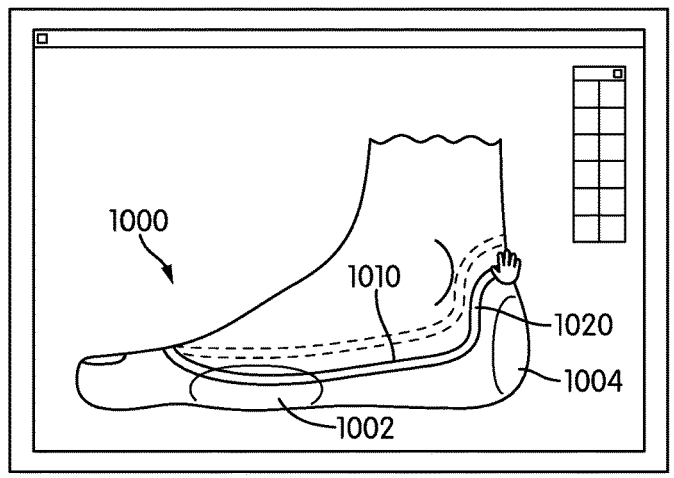
Figure 22:
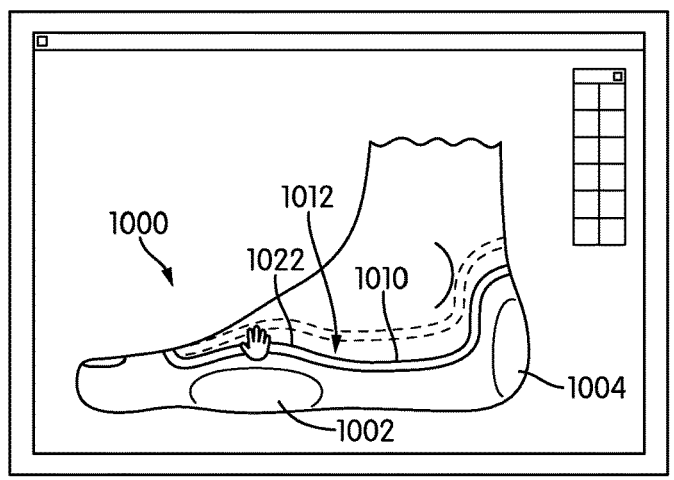
Figure 23:
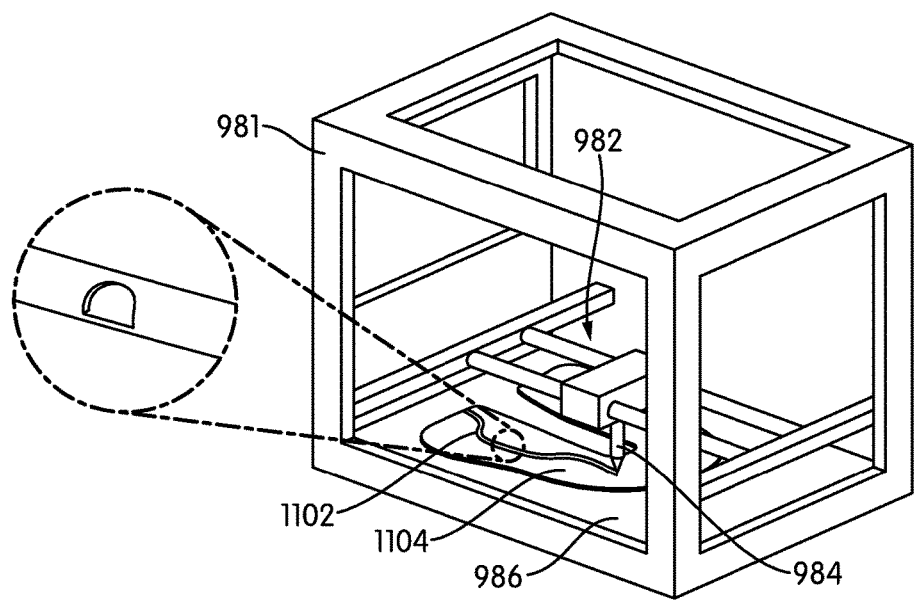
FIGS. 23-25 illustrate schematic views of forming an article with a tubular structure using three-dimensional printing techniques, according to an embodiment.
Figure 24:
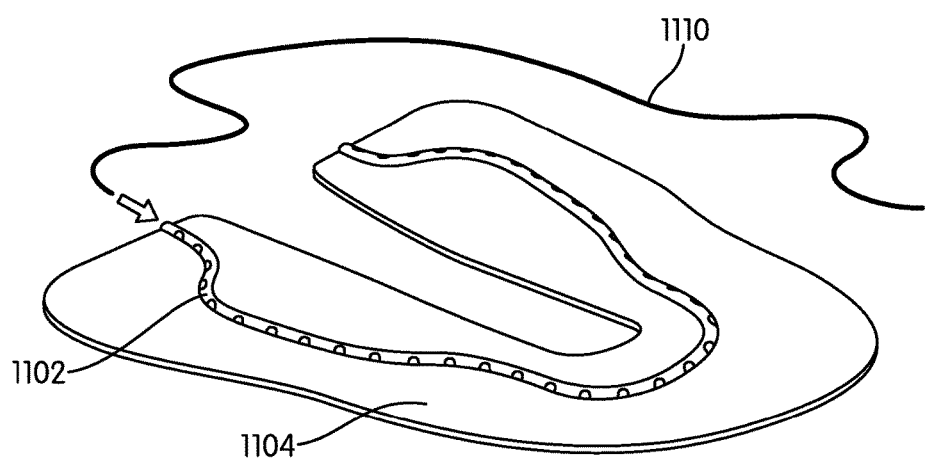
Figure 25:
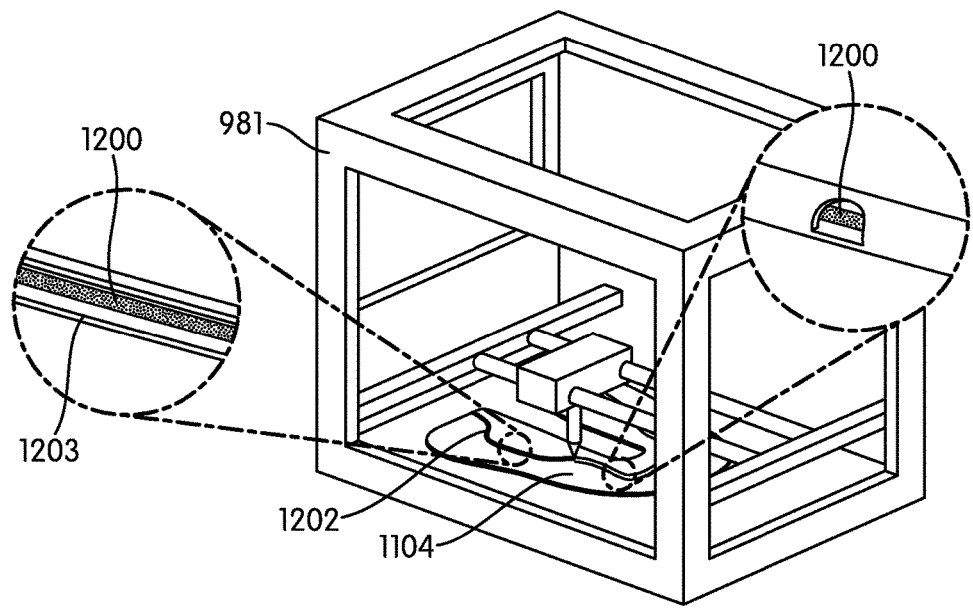
Figure 26:
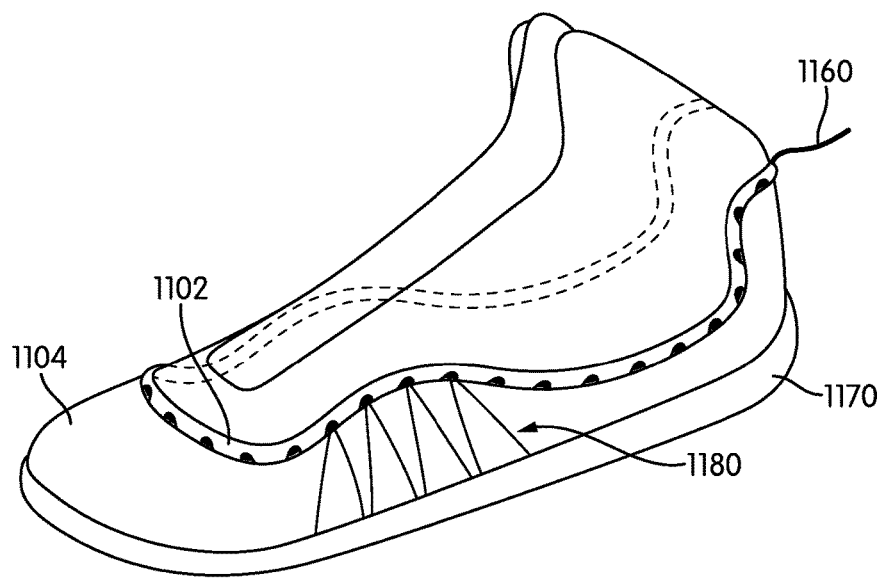
FIG. 26 is a schematic view of an embodiment of an article of footwear with a tubular structure manufactured using the processes of FIGS. 17-25.

In first step 1050, custom foot geometry information may be received. An exemplary embodiment of this step is depicted in FIGS. 18 and 19, and discussed in further detail below. Next, during step 1052, a custom contoured path for a tubular structure could be determined, for example, as shown in FIGS. 20-22, and discussed below. Next, during step 1054, a print material may be disposed onto an upper to form a tubular structure with the custom contoured path, as shown in FIGS. 23-25 and discussed below. Finally, during step 1056, an article of footwear can be manufactured using the upper with a tubular structure arranged in a customized path, as shown in FIG. 26.

FIG. 18 is a schematic view of some components of footwear customization system 960. Footwear customization system 960 may include provisions for customizing a tensioning system on an article. Specifically, footwear customization system 960 includes provisions for creating a tubular structure with a customized contoured path that is designed for a unique foot geometry. As seen in FIG. 18, footwear customization system 960 can include foot geometry capturing system 970, additive manufacturing device 980, and computing system 990.

Foot geometry capturing system 970, or simply capturing system 970, may include provisions for capturing geometric information about a foot, such as the foot of a customer. This geometric information can include size (e.g., length, width, and/or height) as well as three-dimensional information corresponding to a foot (e.g., forefoot geometry, midfoot geometry, heel geometry, and ankle geometry). In at least one embodiment, the captured geometric information for a foot can be used to generate a three-dimensional model of the foot for use in later stages of manufacturing. For purposes of convenience, the term "foot geometry information" is used throughout the detailed description and in the claims to refer to any information related to the size and/or shape of a foot. In particular, foot geometry information can include at least the width and length of the foot. In some cases, foot geometry information may include information about the three-dimensional foot geometry. Foot geometry information can be used to create a three-dimensional model of the foot.

As shown in FIG. 18, in some embodiments, foot geometry information about foot 961 may be retrieved using capturing system 970 to capture two-dimensional and/or three-dimensional information about foot 961 (e.g., the foot of a user or customer). Of course, it is also contemplated that in at least some embodiments, foot geometry information could be captured in any other manner, including manually using various conventional measuring devices (e.g., a tape measure, Brannock Device, etc.). Furthermore, in at least some embodiments, rather than capturing or directly measuring foot geometry information, the customized foot information could be retrieved from a database, or provided directly by the user or customer.

Capturing system 970 may include one or more sensing systems and/or sensing devices capable of sensing (e.g., capturing) customized foot information. In one embodiment, capturing system 970 includes at least two optical sensing devices. Specifically, capturing system 970 may include optical sensing device 972 and optical sensing device 974, which may act together to capture foot geometry information, including the dimensions and/or shape of foot 961.

Optical sensing devices may be any kind of device capable of capturing image information. Examples of different optical sensing devices that can be used include, but are not limited to, still-shot cameras, video cameras, digital cameras, non-digital cameras, web cameras (web cams), as well as other kinds of optical sensing devices known in the art. The type of optical sensing device may be selected according to factors such as desired data transfer speeds, system memory allocation, form factor of the optical sensing device, desired spatial resolution for viewing a foot, as well as possibly other factors.

Exemplary image sensing technologies that could be used with an optical sensing device include, but are not limited to, semiconductor charge-coupled devices (CCD), complementary metal-oxide-semiconductor (CMOS) type sensors, N-type metal-oxide-semiconductor (NMOS) type sensors as well as possibly other kinds of sensors. In some other embodiments, optical sensing devices that detect non-visible wavelengths (including, for instance, infrared wavelengths) could also be used.

For purposes of illustration, two cameras are depicted in FIG. 18. Such a configuration could allow for three-dimensional imaging using a stereoscopic imaging technique. However, other embodiments could utilize any other number of cameras. Moreover, other embodiments could be configured with any other kind of 3D scanning technologies including contact 3D scanning (e.g., coordinate measuring machine), time-of-flight 3D laser scanning, triangulation-based 3D laser scanning as well as possibly other kinds of 3D scanning technologies.

Although optical sensing device 972 and optical sensing device 974 are shown here in a static configuration, it is contemplated that in some embodiments optical sensing device 972 and/or optical sensing device 974 could be moved to various positions to capture additional views of foot 961. Optionally, in some embodiments, the method can include having a user (e.g., a customer) move to locate foot 961 at different orientations with respect to optical sensing device 972 and/or optical sensing device 974.

Alternatively, rather than using devices for capturing three-dimensional geometry of a foot, embodiments could include a foot scanning device to measure pressure across the sole of the foot. For example, FIG. 19 illustrates an embodiment employing foot scanning device 979 that can be used to generate foot pressure information, shown here as foot pressure image 992. In order to obtain foot pressure information, embodiments could use any of the systems, devices, and methods for imaging a foot as disclosed in Gregory et al., U.S. Patent Publication Number 2013/0258085, published Oct. 3, 2013 and titled "Foot Imaging and Measurement Apparatus," the entirety of which is herein incorporated by reference.

Foot geometry information can be used to locate particular anatomical areas on the foot that may be important to consider in designing a path for a tubular structure. Such anatomical areas can include, for example, arch geometry, forefoot, midfoot, and/or heel geometry, as well areas associated with specific bones or bony features (i.e., bony structures).

Referring to FIG. 17, footwear customization system 960 includes additive manufacturing device 980. The term "additive manufacturing," also referred to as "three-dimensional printing," refers to any device and technology for making a three-dimensional object through an additive process where layers of material are successively laid down under the control of a computer. Exemplary additive manufacturing techniques that could be used include, but are not limited to, extrusion methods such as fused deposition modeling (FDM), electron beam freeform fabrication (EBF), direct metal laser sintering (DMLS), electron beam melting (EBM), selective laser melting (SLM), selective heat sintering (SHS), selective laser sintering (SLS), plaster-based 3D printing, laminated object manufacturing (LOM), stereolithography (SLA), and digital light processing (DLP). In one embodiment, additive manufacturing device 980 could be a fused deposition modeling type printer configured to print thermoplastic materials such as acrylonitrile butadiene styrene (ABS) or polyactic acid (PLA).

An example of a printing device using fused filament fabrication (FFF) is disclosed in Crump, U.S. Pat. No. 5,121,329, filed Oct. 30, 1989 and titled "Apparatus and Method for Creating Three-Dimensional Objects," which application is herein incorporated by reference and referred to hereafter as the "3D Objects" application. Embodiments of the present disclosure can make use of any of the systems, components, devices, and methods disclosed in the 3D Objects application.

Additive manufacturing device 980 may be used to manufacture one or more components used in forming an article of footwear. For example, additive manufacturing device 980 may be used to form a tubular structure on an upper.

Additive manufacturing device 980 may include device housing 981, actuating assembly 982, and extrusion head 984 (see FIG. 23). Additive manufacturing device 980 may also include platform 986. In some cases, extrusion head 984 may be translated via actuating assembly 982 on a z-axis (i.e., vertical axis), while platform 986 of additive manufacturing device 980 may move in the x and y directions (i.e., horizontal axis). In other cases, extrusion head 984 could have full three-dimensional movement (e.g., x-y-z movement) above a fixed platform.

Embodiments can include provisions for controlling capturing system 970 and additive manufacturing device 980, as well as processing information related to the customization process. These provisions can include a computing system 990 and a network. Generally, the term "computing system" refers to the computing resources of a single computer, a portion of the computing resources of a single computer, and/or two or more computers in communication with one another. Any of these resources can be operated by one or more human users. In some embodiments, computing system 990 may include one or more servers. In some cases, a separate server (not shown) may be primarily responsible for controlling and/or communicating with devices of footwear customization system 960, while a separate computer (e.g., desktop, laptop, or tablet) may facilitate interactions with a user or operator. Computing system 990 can also include one or more storage devices including, but not limited to magnetic, optical, magneto-optical, and/or memory, including volatile memory and non-volatile memory.

Computing system 990 may comprise viewing interface 996 (e.g., a monitor or screen), input devices 997 (e.g., keyboard and/or mouse), and software for designing a computer-aided design ("CAD") representation of a three-dimensional model. In at least some embodiments, the CAD representation can provide a representation of an article of footwear as well as representations of elements of a tensioning system, such as a tubular structure.

In some embodiments, computing system 990 may be in direct contact with one or more devices or systems of footwear customization system 960 via network 999. The network may include any wired or wireless provisions that facilitate the exchange of information between computing system 990 and devices of footwear customization system 960. In some embodiments, the network may further include various components such as network interface controllers, repeaters, hubs, bridges, switches, routers, modems, and firewalls. In some cases, the network may be a wireless network that facilitates wireless communication between two or more systems, devices and/or components of footwear customization system 960. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, the network could be a wired network including networks whose signals are facilitated by twister pair wires, coaxial cables, and optical fibers. In still other cases, a combination of wired and wireless networks and/or connections could be used.

In some embodiments, the captured foot geometry information can be delivered to computing system 990 via network 999. Once received, the foot geometry information may be stored as raw data. In the exemplary embodiment shown in FIG. 20, the customized foot information may be used to create customized model 1000. Customized model 1000 may be a three-dimensional model that represents the size and/or geometric information about a user's foot. In some embodiments, customized model 1000 may represent an upper configured to be worn on a user's foot. In other embodiments, a customized model could represent a foot. In the exemplary embodiment, customized model 1000 represents a foot.

As seen in FIG. 20, the customized model 1000, or the raw customized foot information captured (or otherwise retrieved) during previous steps, can be used to design a custom contoured path for a tubular structure on an upper. As used herein, the term "custom contoured path" refers to a path or layout for a tubular structure on an upper that extends throughout the upper. As the anatomy of each customer's foot may be unique, a custom contoured path may be designed to provide optimum support while minimizing discomfort by creating a path for a tubular structure that avoids one or more bony regions of an upper.

Customized model 1000 includes various anatomical regions that may be considered in designing the path of a tubular structure on an upper. For purposes of clarity, first anatomical region 1002 and second anatomical region 1004 are shown; however, it may be understood that customized model 1000 can be characterized by other anatomical regions. In this case, first anatomical region 1002 may be associated with the first metatarsal bone, while second anatomical region 1004 may be associated with a protruding feature of the calcaneus bone (i.e., a bony structure).

A user may interact with customized model 1000 using a CAD system (e.g., CAD software). Such a system may allow the user to design a customized path for a tubular structure around the upper (or foot). Embodiments may utilize any standard CAD or other software tool for designing a particular tubular structure geometry.

As it may be desirable to avoid applying pressure directly to either first anatomical region 1002 or second anatomical region 1004, a path for a tubular structure may be configured to travel around these regions, rather than across or through them. In FIG. 20 an initial path for tubular structure 1010 has been generated. Such a path may be generated automatically by the CAD system (e.g., software) running on computing system 990. The system can include provisions allowing a user to modify the geometry, or path, of tubular structure 1010 on customized model 1000. For example, as seen in FIG. 21, a user can drag rearward section 1020 of tubular structure 1010 up and around second anatomical region 1004 so as increase comfort at second anatomical region 1004. Likewise, as seen in FIG. 22, a user can drag medial side section 1022 of tubular structure 1010 up and around first anatomical region 1002 to increase comfort at first anatomical region 1002.

It may be appreciated that the embodiment depicted in FIGS. 20-22 is only intended to be exemplary. In other embodiments, a user may design a tubular structure with any geometry and customized path around a foot (and article).

Moreover, some embodiments could include provisions that allow the user to design hole openings (e.g., locations and/or size), as well as the locations of secondary tensile strands.

In some embodiments, some of the design steps may be automated. For example, in some cases, the task of designing a customized contoured path could be automatically done by a customization system. In other words, in some embodiments, the system may automatically generate a customized path or three-dimensional geometry for a tubular structure on an article based on input information such as customized foot geometry and/or pressure distribution information.

Once a desired custom contoured path for tubular structure 1010 has been designed, a user may submit custom tubular structure design 1012 to additive manufacturing device 980 (see FIG. 18) for printing onto an upper. In some cases, information related to tubular structure 1010 (including the custom contoured path information) can be provided to additive manufacturing device 980 in the form of a 3D printing file format. In one embodiment, for example, tubular structure 1010 and/or information associated with tubular structure 1010 could be provided to additive manufacturing device 980 in an STL file format, which is a Stereolithography file format for 3D printing. In other embodiments, the information could be stored and/or transferred in the Additive Manufacturing File Format (AMF), which is an open standard for 3D printing information. Still other embodiments could store and/or transfer information using the X3D file format. In still other embodiments, any other file formats known for storing 3D objects and/or 3D printing information could be used.

FIG. 23 illustrates an embodiment of a step of printing tubular structure 1102 with a custom contoured path onto upper 1104. In particular, extrusion head 984 may deposit a printable material onto the surface of upper 1104 to form the tubular structure. A tubular structure with a hollow tunnel could be formed using a variety of different techniques. Embodiments could utilize any of the methods, processes, materials, and/or systems for printing tubular structures with a hollow tunnel onto an article that is disclosed in U.S. Patent Application No. 62/263,834, filed Dec. 7, 2015, titled "Three Dimensional Printing Utilizing a Captive Element," which is herein incorporated by reference in its entirety and hereafter referred to as the "captive element application." Any known materials for three-dimensional printing could be used, including any of the printable materials described above.

After tubular structure 1102 has been printed, first tensile strand 1110 may be inserted into the tunnel of tubular structure 1102, as shown in FIG. 24.

FIG. 25 illustrates another embodiment in which first tensile strand 1200 is embedded within a tubular structure as it is printed. Specifically, first layer 1203, or portion, of tubular structure 1202 may be initially printed onto upper 1104. Then, first tensile strand 1200 may be placed on first layer 1203. After this, the remaining layers of tubular structure 1202 may be printed onto first layer 1203 and over first tensile strand 1200, such that first tensile strand 1200 is embedded during the printing process.

FIG. 26 illustrates an exemplary embodiment of a final product produced by at least one of the processes described above and shown in FIGS. 18-25. Referring to FIG. 26, upper 1104 has been reshaped to form an upper and assembled with sole structure 1170. As shown, tubular structure 1102 has a customized path on upper 1104 that has been created to bypass sensitive anatomical features or regions. Moreover, as part of forming the final article, second tensile strands 1180 have been run around tensile strand 1160 and anchored to the article at the bite line between upper 1104 and sole structure 1170.

Embodiments may also make use of any of the configurations, components, materials and/or methods disclosed in U.S. Patent Application No. 62/263,898, filed Dec. 7, 2015 and titled "Article of Footwear with Tubular Structures Having Tab Portions" the entirety of which is herein incorporated by reference.

Additive manufacturing processes may be used to form structures on flat receiving surfaces as well as on contoured or non-flat surfaces. For example, some embodiments depicted in the figures may illustrate methods whereby material is printed onto a flattened surface of an article, such as a material section of an upper that has a flat or unassembled configuration. In such cases, printing material onto the surface may be accomplished by depositing material in thin layers that are also flat. Thus, a print head or nozzle may move in one or more horizontal directions to apply an Nth layer of material and then move in the vertical direction to begin forming the N+1 layer. However, it should be understood that in other embodiments material could be printed onto a contoured or non-flat surface. For example, material could be printed onto a three-dimensional last, where the surface of the last is not flat. In such cases, the printed layers applied to the surface may also be contoured. In order to accomplish this method of printing, a print head or nozzle may be configured to move along a contoured surface and tilt, rotate or otherwise move so that the print head or nozzle is always aligned approximately normal to the surface where printed material is being applied. In some cases, a print head could be mounted to a robotic arm, such as an articulated robotic arm with six degrees of freedom. Alternatively, in still other embodiments, an object with a contoured surface could be re-oriented under a nozzle so that contoured layers of printed material could be applied to the object. For example, embodiments could make use of any of the systems, features, components and/or methods disclosed in Mozeika et al., U.S. Patent Publication Number 2013/0015596, published Jan. 17, 2013 (and filed as U.S. application Ser. No. 13/530,664 on Jun. 22, 2012), titled "Robotic fabricator," the entirety of which is herein incorporated by reference. Embodiments could also make use of any of the systems, features, components and/or methods disclosed in Cannell et al., U.S. Pat. No. 8,123,350, issued Feb. 28, 2012, titled "Computerized apparatus and method for applying graphics to surfaces," the entirety of which is herein incorporated by reference. Thus, it may be appreciated that the present embodiments are not limited to printing processes used for printing to flat surfaces and may be used in conjunction with printing systems that can print to any kinds of surfaces having any kinds of geometry.

The printed structures of the present embodiments may provide enhanced support. In some cases, one or more printed structures may be attached to an underlying component such as a fabric layer of an upper or other article, and may act to enhance support over a portion of the component. This may occur in situations where the printed structure is more rigid than an underlying material (e.g., fabric, leather, etc.). In some cases, printed structures, such as tubular structures, could extend throughout portions of an article to form an external support system, like an exoskeleton, which helps provide increased support through those portions.

The embodiments further provide a comprehensive fit system that delivers a tuned and pressure-free fit for an article. This is accomplished by steering the articulated tunnel structures around bony prominences of the foot.

When a tensile strand extending through the tunnel structures is pulled under tension (e.g., by the laces or another tensile element) the tunnel geometry and article-substrate (e.g., fabric layer) contract around predetermined zones of the foot.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. An article of footwear, comprising: an upper; a sole structure; a tubular structure extending along the upper, the tubular structure including a first end, a second end, and an intermediate portion, wherein the intermediate portion is attached to the upper; the tubular structure having a tunnel extending through the tubular structure from the first end to the second end, wherein the intermediate portion of the tubular structure includes a surface with a plurality of openings extending to the tunnel; a first tensile strand extending through the tunnel of the tubular structure; a secondary tensile strand having a first portion attached to the sole structure; and the secondary tensile strand also having a second portion engaged with the first tensile strand, wherein a portion of the first tensile strand extends through a first opening of the plurality of openings in the tubular structure to engage the second portion of the secondary tensile strand; wherein applying tension to the first tensile strand also applies tension to the secondary tensile strand at the second portion of the secondary tensile strand.

2. The article of footwear according to claim 1, wherein: a third portion of the secondary tensile strand is attached to an attachment region of the article of footwear; and wherein the second portion of the secondary tensile strand is disposed between the first portion of the secondary tensile strand and the third portion of the secondary tensile strand.

3. The article of footwear according to claim 1, wherein: the tubular structure has an axial direction and a circumferential direction; wherein the plurality of openings includes a second opening; and wherein a center of the first opening has a different circumferential orientation than a center of the second opening.

4. The article of footwear according to claim 1, wherein applying tension across the first tensile strand elastically deforms the intermediate portion of the tubular structure.

5. The article of footwear as in claim 4, wherein the upper includes a base portion proximate the intermediate portion of the tubular structure, the base portion having a geometry, and wherein the geometry of the base portion changes when the tubular structure is elastically deformed.

6. An article of footwear, comprising: an upper; a sole structure; a tubular structure, the tubular structure including a first end, a second end, a first intermediate portion and a second intermediate portion, the first intermediate portion being attached to the upper and the second intermediate portion being attached to the upper; the tubular structure having a tunnel extending through the tubular structure from the first end to the second end; wherein the first intermediate portion of the tubular structure includes a first opening extending to the tunnel and wherein the second intermediate portion of the tubular structure includes a second opening extending to the tunnel; a first tensile strand extending through the tunnel of the tubular structure; a plurality of secondary tensile strands comprising a secondary tensile strand and another secondary tensile strand, the secondary tensile strand having a first portion engaging the first tensile strand adjacent the first opening and a second portion engaging the first tensile strand adjacent the second opening; wherein applying tension along the secondary tensile strand applies tension between two different portions of the first tensile strand, wherein the first intermediate portion has a third opening, the another secondary tensile strand engages the first tensile strand adjacent the third opening, and wherein the another secondary tensile strand is anchored to the sole structure.

7. The article of footwear according to claim 6, wherein the tubular structure includes at least one non-linear portion between the first intermediate portion and the second intermediate portion.

8. The article of footwear according to claim 6, wherein the secondary tensile strand extends over a top portion of the upper.

9. The article of footwear according to claim 6, wherein the secondary tensile strand has a different diameter than the first tensile strand.

10. The article of footwear according to claim 6, wherein the first intermediate portion is on a medial side of the upper; and wherein the second intermediate portion is on a lateral side of the upper.

* * * * *